US011210539B2

United States Patent
Ramaglia et al.

(10) Patent No.: US 11,210,539 B2
(45) Date of Patent: Dec. 28, 2021

(54) DETECTION AND MONITORING OF ACTIVE OPTICAL RETROREFLECTORS

(71) Applicant: Joyson Safety Systems Acquisition LLC, Auburn Hills, MI (US)

(72) Inventors: Joshua Ramaglia, Davison, MI (US); Len Cech, Brighton, MI (US)

(73) Assignee: Joyson Safety Systems Acquisition LLC, Auburn Hills, MI (US)

( * ) Notice: Subject to any disclaimer, the term of this patent is extended or adjusted under 35 U.S.C. 154(b) by 86 days.

(21) Appl. No.: 16/841,154

(22) Filed: Apr. 6, 2020

(65) Prior Publication Data

US 2020/0320318 A1    Oct. 8, 2020

Related U.S. Application Data

(60) Provisional application No. 62/829,475, filed on Apr. 4, 2019.

(51) Int. Cl.
*G06K 9/00* (2006.01)
*B60Q 3/70* (2017.01)
(Continued)

(52) U.S. Cl.
CPC ......... *G06K 9/00832* (2013.01); *B60Q 3/242* (2017.02); *B60Q 3/70* (2017.02); *G06K 9/2027* (2013.01); *G06K 9/2036* (2013.01)

(58) Field of Classification Search
None
See application file for complete search history.

(56) References Cited

U.S. PATENT DOCUMENTS 4,885,566 A    12/1989 Aoki et al.
5,187,465 A    2/1993 Stonerook et al.
(Continued)

FOREIGN PATENT DOCUMENTS

FR    2877279 B1    6/2008
JP    2017-056877 A    3/2017
(Continued)

OTHER PUBLICATIONS

International Search Report and Written Opinion issued for Application No. PCT/US2020/026938, dated Jul. 17, 2020.
(Continued)

*Primary Examiner* — Justin P. Misleh
(74) *Attorney, Agent, or Firm* — Meunier Carlin & Curfman LLC

(57) ABSTRACT

A system of detecting vehicle components in operation in a vehicle includes at least one light source configured to emit a predetermined wavelength of light onto structures within the vehicle, wherein at least one of the structures may include a passenger seat belt assembly having a pattern of reflection and retroreflective surfaces tuned to a predetermined wavelength at a preferred luminance. At least one 3-D time of flight camera is positioned in the vehicle to receive reflected light from the structures in the vehicle and provide images of the structures that distinguish the preferred luminance of the pattern from other structures in the vehicle. A computer processor connected to computer memory and the camera includes computer readable instructions causing the processor to reconstruct 3-D information in regard to respective images of the structures and calculate a depth measurement of the distance of the reflective pattern on the passenger seat belt assembly from the camera.

17 Claims, 27 Drawing Sheets

(51) Int. Cl.
*G06K 9/20* (2006.01)
*B60Q 3/242* (2017.01)

(56) References Cited

U.S. PATENT DOCUMENTS

| | | | |
|---|---|---|---|
| 5,330,226 A | | 7/1994 | Gentry et al. |
| 5,440,913 A | | 8/1995 | Crispin et al. |
| 5,472,235 A | * | 12/1995 | Dubay ............... B60R 22/12 |
| | | | 280/801.1 |
| 5,726,887 A | | 3/1998 | Spies et al. |
| 5,785,347 A | | 7/1998 | Adolph et al. |
| 5,927,752 A | | 7/1999 | Brandin |
| 6,139,158 A | | 10/2000 | Nilsen et al. |
| 6,151,540 A | | 11/2000 | Anishetty |
| 6,203,059 B1 | | 3/2001 | Mazur et al. |
| 6,218,739 B1 | | 4/2001 | Fendt |
| 6,260,650 B1 | | 7/2001 | Gustavsson |
| 6,302,438 B1 | | 10/2001 | Stopper et al. |
| 6,568,817 B1 | | 5/2003 | Mimura et al. |
| 6,598,900 B2 | | 7/2003 | Stanley et al. |
| 6,628,390 B1 | | 9/2003 | Johnson |
| 6,771,175 B1 | | 8/2004 | Eagle et al. |
| 6,778,337 B2 | | 8/2004 | Aoki et al. |
| 6,781,676 B2 | | 8/2004 | Wallace et al. |
| 6,961,443 B2 | | 11/2005 | Mahbub |
| 6,985,077 B2 | | 1/2006 | Nathan et al. |
| 7,039,513 B2 | | 5/2006 | Hermann et al. |
| 7,095,002 B2 | | 8/2006 | Kong et al. |
| 7,110,571 B2 | | 9/2006 | Occhipinti |
| 7,145,448 B2 | | 12/2006 | Tanaka et al. |
| 7,406,181 B2 | | 7/2008 | O'Boyle et al. |
| 8,036,795 B2 | | 10/2011 | Allen |
| 2001/0003168 A1 | | 6/2001 | Breed et al. |
| 2005/0012055 A1 | | 1/2005 | Chien |
| 2005/0111700 A1 | | 5/2005 | O'Boyle et al. |
| 2005/0263992 A1 | * | 12/2005 | Matsuda ............ G06K 9/00838 |
| | | | 280/735 |
| 2006/0049929 A1 | | 3/2006 | Lawrence et al. |
| 2006/0092401 A1 | | 5/2006 | Troxell et al. |
| 2006/0208169 A1 | | 9/2006 | Breed et al. |
| 2007/0055428 A1 | | 3/2007 | Kong et al. |
| 2007/0085669 A1 | | 4/2007 | Becker et al. |
| 2007/0194900 A1 | | 8/2007 | Hawkins et al. |
| 2007/0195990 A1 | | 8/2007 | Levy |
| 2007/0206836 A1 | | 9/2007 | Yoon et al. |
| 2007/0222572 A1 | | 9/2007 | Downey et al. |
| 2008/0048887 A1 | | 2/2008 | Aoki et al. |
| 2008/0094195 A1 | | 4/2008 | Odate et al. |
| 2008/0164682 A1 | | 7/2008 | Matsuda |
| 2009/0034794 A1 | | 2/2009 | Ishikawa |
| 2009/0058061 A1 | * | 3/2009 | Fuisz ............... B60R 22/48 |
| | | | 280/801.1 |
| 2009/0096200 A1 | * | 4/2009 | Jamison ............ B60R 22/12 |
| | | | 280/804 |
| 2010/0018425 A1 | | 1/2010 | Schaedlich et al. |
| 2013/0100250 A1 | | 4/2013 | Raskar et al. |
| 2013/0123015 A1 | | 5/2013 | Jung et al. |
| 2015/0189144 A1 | | 7/2015 | Yoshii |
| 2015/0212335 A1 | | 7/2015 | Shimatani |
| 2015/0283974 A1 | | 10/2015 | Schlittenbauer |
| 2016/0159320 A1 | * | 6/2016 | Andreen ............ B60R 22/48 |
| | | | 382/103 |
| 2017/0129272 A1 | | 5/2017 | Rich et al. |
| 2017/0351927 A1 | * | 12/2017 | Graumann ......... G06K 9/00832 |
| 2018/0186321 A1 | | 7/2018 | Naghizadeh et al. |
| 2018/0211123 A1 | * | 7/2018 | Yasuda .............. G06K 9/2027 |
| 2018/0326944 A1 | | 11/2018 | Cech et al. |
| 2019/0197326 A1 | * | 6/2019 | Ohno ................ G06K 9/00832 |
| 2019/0375360 A1 | * | 12/2019 | Hiroki .............. B60R 21/01544 |
| 2020/0055480 A1 | * | 2/2020 | Herbert ........... B60R 21/01538 |
| 2020/0238851 A1 | * | 7/2020 | Kuepper ............ G01B 11/26 |
| 2020/0298794 A1 | * | 9/2020 | Dingli .............. B60R 22/48 |

FOREIGN PATENT DOCUMENTS

| | | | |
|---|---|---|---|
| WO | 2001079897 | 10/2001 | |
| WO | 2005103770 | 11/2005 | |
| WO | 2016063028 | 4/2016 | |
| WO | 2017011476 | 1/2017 | |
| WO | WO-2019188060 A1 * | 10/2019 | ............. B60R 22/48 |

OTHER PUBLICATIONS https://en.wikipedia.org/wiki/Bidirectional_reflectance_distribution_function citing Nicodemus, Fred (1965). "Directional Reflectance and Emissivity of an Opaque Surface". Applied Optics. 4 (7): 767-775.

* cited by examiner

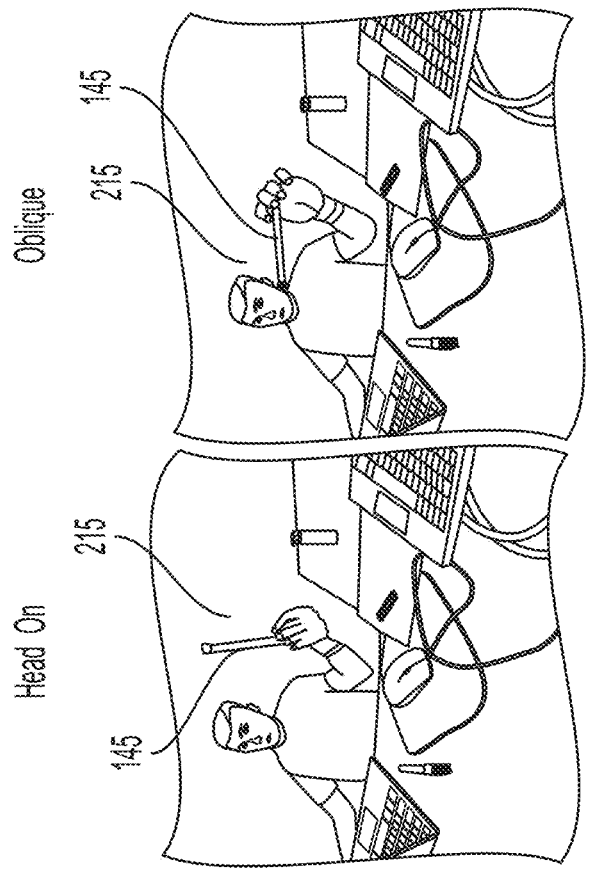
FIG. 9B
FIG. 9C
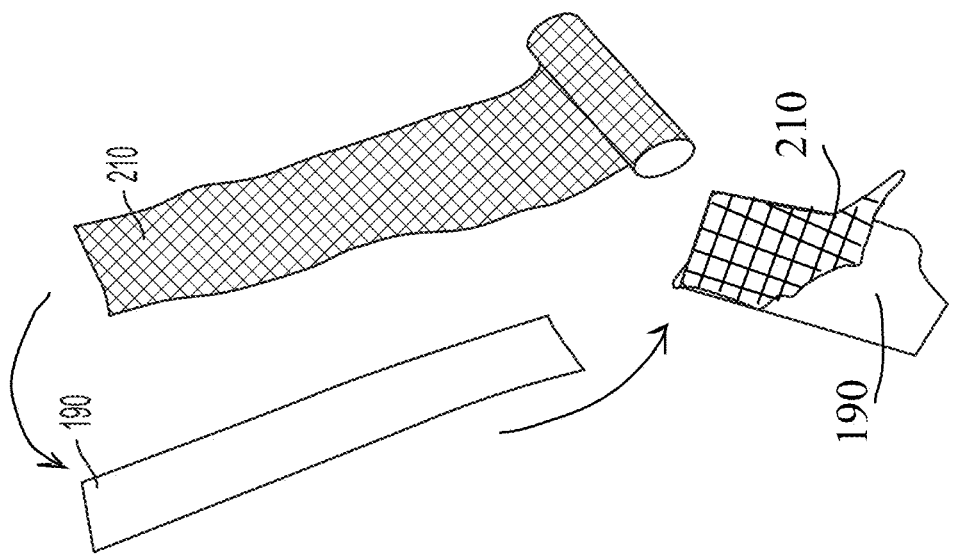
FIG. 9A

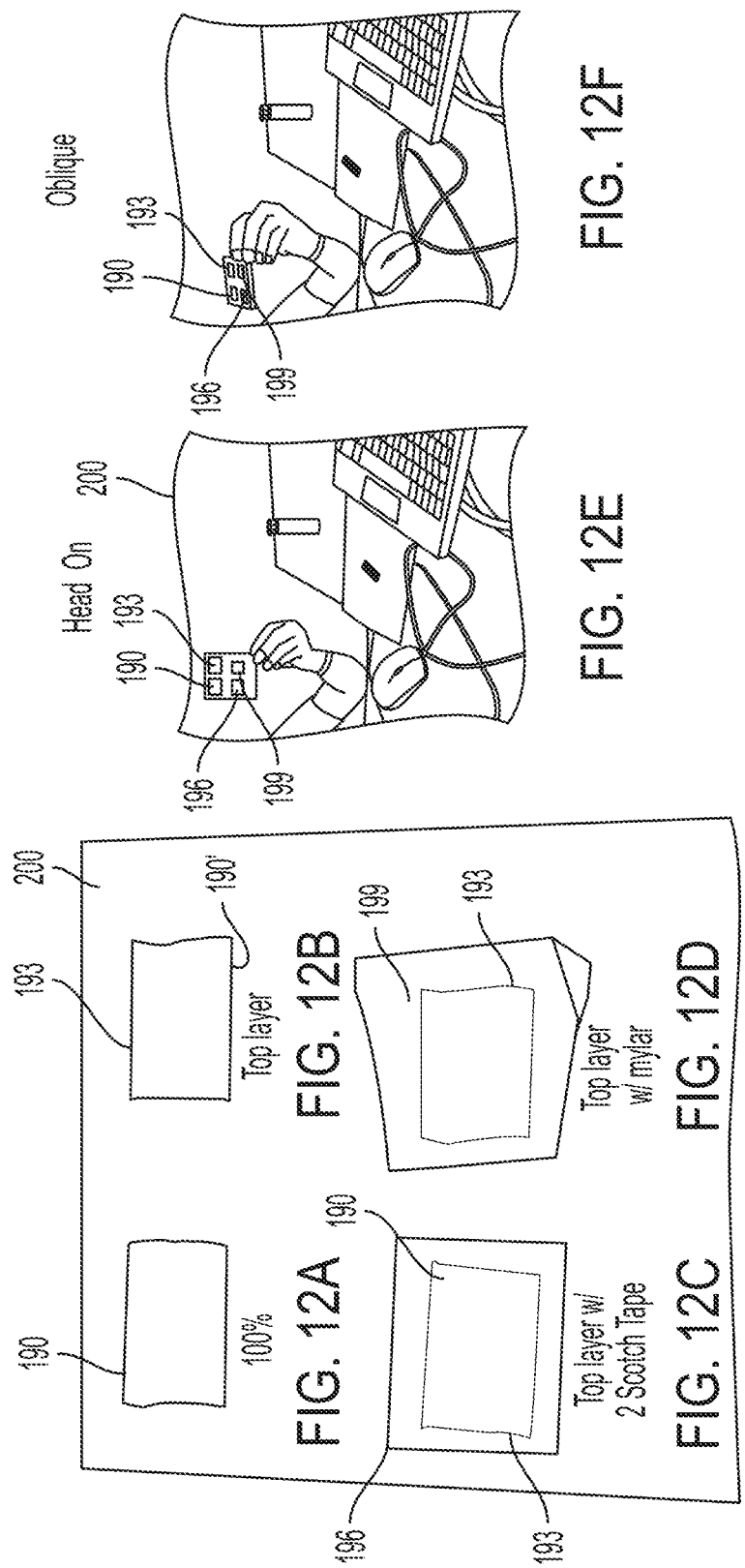

FIG. 22

DETECTION AND MONITORING OF ACTIVE OPTICAL RETROREFLECTORS

CROSS REFERENCE TO RELATED APPLICATIONS

This application claims priority to and incorporates entirely by reference U.S. Provisional Patent Application Ser. No. 62/829,475 filed on Apr. 4, 2019, and entitled "Detection and Monitoring of Active Optical Retroreflectors."

TECHNICAL FIELD

The disclosure presented herein relates to imaging systems within a vehicle passenger cabin and is directed to locating, identifying, and highlighting changes in status of occupants and structures in the vehicle cabin.

BACKGROUND

Seat belts are standard equipment for almost every kind of vehicle in which occupants are transported in today's transportation systems. Not only are original equipment manufacturers (OEMs) required to meet strict standards for seat belt engineering and installation, but in many scenarios, vehicle occupants are required to wear seat belts as a matter of law. Even with manufacturing regulations and use laws in place, however, overall vehicle safety is entirely dependent upon vehicle occupants using seat belts properly. Visual inspection by outside authorities is not completely reliable given that a vehicle interior is only partially visible from outside of a vehicle. Individuals attempting to circumvent seat belt use laws also position seat belts inside a vehicle in a way that gives an appearance of seat belt use but allows the vehicle occupant more latitude in range of movement (i.e., fastening the seat belt behind the user's back or pulling the seat belt only partially across the user's body and manipulating the seat belt spool to maintain the seat belt in an extended position without requiring a fixed latching).

Seat belt misuse and/or unreliable seat belt monitoring may implicate issues other than simple bodily protection by restraining an occupant during an accident. Detection and tracking of occupant seat belt use has been primarily accomplished using on/off switches as sensors that transmit corresponding buckled/unbuckled data signals to a central processor as part of a vehicle control system data gathering operation. Sensor state from the seat belt switches can be used to determine restraint settings and used, for example, to determine air bag suppression or deployment decisions. Motorized seat belts may also use belt payout sensors and/or belt tension sensors, where these sensors can be used to detect and/or track proper belt placement as well as dynamic changes in the seat belt payout when the occupant is moving. Such sensors can be used to control restraint settings statically and/or dynamically.

Prior methods of seat belt monitoring can be effective but can also be spoofed. As noted above, individuals continue to engage in improper seat belt buckling behind or under the occupant, attaching buckle surrogates without using the seat belt, and maneuvering themselves out of the seat belt, particularly the shoulder strap, by hand. Furthermore, many rear seating locations do not currently use seatbelt switches, belt payout sensors, or belt tension sensors. It may be difficult to install the necessary electronics in adjustable and movable seating locations to support buckle switches, payout or tension sensors as aftermarket control hardware.

A need continues to exist in the vehicle market for control systems that monitor vehicle occupants for proper seat belt use and provide seat belt use and position data to the control system to enact additional safety precautions as discussed herein.

SUMMARY OF THE DISCLOSURE

A vehicle cabin monitoring system includes an image sensor connected to a computer processor and computer memory comprising software that controls the image sensor, wherein the image sensor is positioned to capture images of at least a portion of a vehicle interior. At least one reference structure is positioned in the vehicle cabin within a field of view of the image sensor. An optically active component is positioned on the reference structure, such that the reference structure incorporates a lighted surface that is included within at least one of the images. A sequence of the images shows differences regarding the lighted surface of the reference structure, said differences indicating at least one status change of at least one item in the vehicle interior.

A vehicle cabin monitoring system incorporates a light source providing projected light along a light projection path within a vehicle interior. An image sensor is connected to a processor and computer memory, wherein the image sensor is positioned to receive either the projected light from the light source or reflected light back from the vehicle interior. At least one reference structure is positioned in the vehicle cabin within the projection path and within a field of view of the image sensor. An optically active component positioned on the reference structure directs the reflected light back to the image sensor. The optically active component comprises a retroreflective surface and an optically attenuating layer on the retroreflective surface. The optically attenuating layer adjusts reflectivity of the optically active component to an extent such that the reflected light arrives at the image sensor from the reference structure at an intensity for which the processor converts the reflected light to a measurement signal that is within a dynamic range of the optical sensor.

A vehicle cabin monitoring system includes a light source providing projected light along a light projection path within a vehicle interior. A 3-D time of flight optical sensor is connected to a processor and computer memory, wherein the optical sensor is positioned to receive reflected light back from the vehicle interior. A plurality of objects are positioned in the vehicle interior within the projection path and within a field of view of the optical sensor, wherein at least one of the items is a reference structure comprising a retroreflective surface and an optically attenuating layer on the retroreflective surface. The optically attenuating layer includes a blocking structure that adjusts reflectivity of the reference structure such that reflected light transmitted from the reference structure to the optical sensor has an adjusted intensity that accounts for a position of the reference structure relative to the image sensor. The 3-D time of flight image sensor and the processor generate a point cloud image comprising a three-dimensional representation of the items relative to the reference structure within the sensor field of view.

A method of monitoring a vehicle cabin includes positioning at least one reference structure in the vehicle interior and positioning at least one source of projected light and at least one optical sensor in the vehicle cabin in respective locations such that a field of view of the optical sensor encompasses at least a portion of the projected light or a corresponding portion of a reflection of the projected light.

Attaching a retroreflective surface onto the at least one reference structure allows for selecting a degree of attenuation of the reflected light according to a position of the reference structure relative to the source of projected light and the optical sensor. Accordingly, the method of this non-limiting embodiment includes electing an optically attenuating layer that provides the selected degree of attenuation to reflected light from the retroreflective layer. Applying the optically attenuating layer onto the retroreflective surface adjusts an intensity of the reflected light.

BRIEF DESCRIPTION OF THE FIGURES

FIG. 9A is a perspective view of one kind of blocking structure in the form of a mesh for positioning over a retroreflective surface as disclosed herein.

FIG. 9B is a perspective view of a retroreflective surface subject to a mesh blocking structure blocking illumination and imaged in a head on orientation as disclosed herein.

FIG. 9C is a perspective view of a retroreflective surface subject to a mesh blocking structure blocking illumination and imaged in an oblique orientation as disclosed herein.

FIG. 12A is a representation of potential constructions for thin film modifications to retroreflective surfaces as disclosed herein.

FIG. 12B is a perspective view of a retroreflective surface subject to thin film modification.

FIG. 12C is a perspective view of a retroreflective surface subject to multiple layers of thin film modification.

FIG. 12D is a perspective view of a retroreflective surface subject to a Mylar™ layer modification.

FIG. 12E is a perspective view of each retroreflective surface with the respective modifications of FIGS. 12A-12D subject to a head on illumination as disclosed herein.

FIG. 12F is a perspective view of each retroreflective surface with the respective modifications of FIGS. 12A-12D subject to an oblique illumination as disclosed herein.

Figure 22:
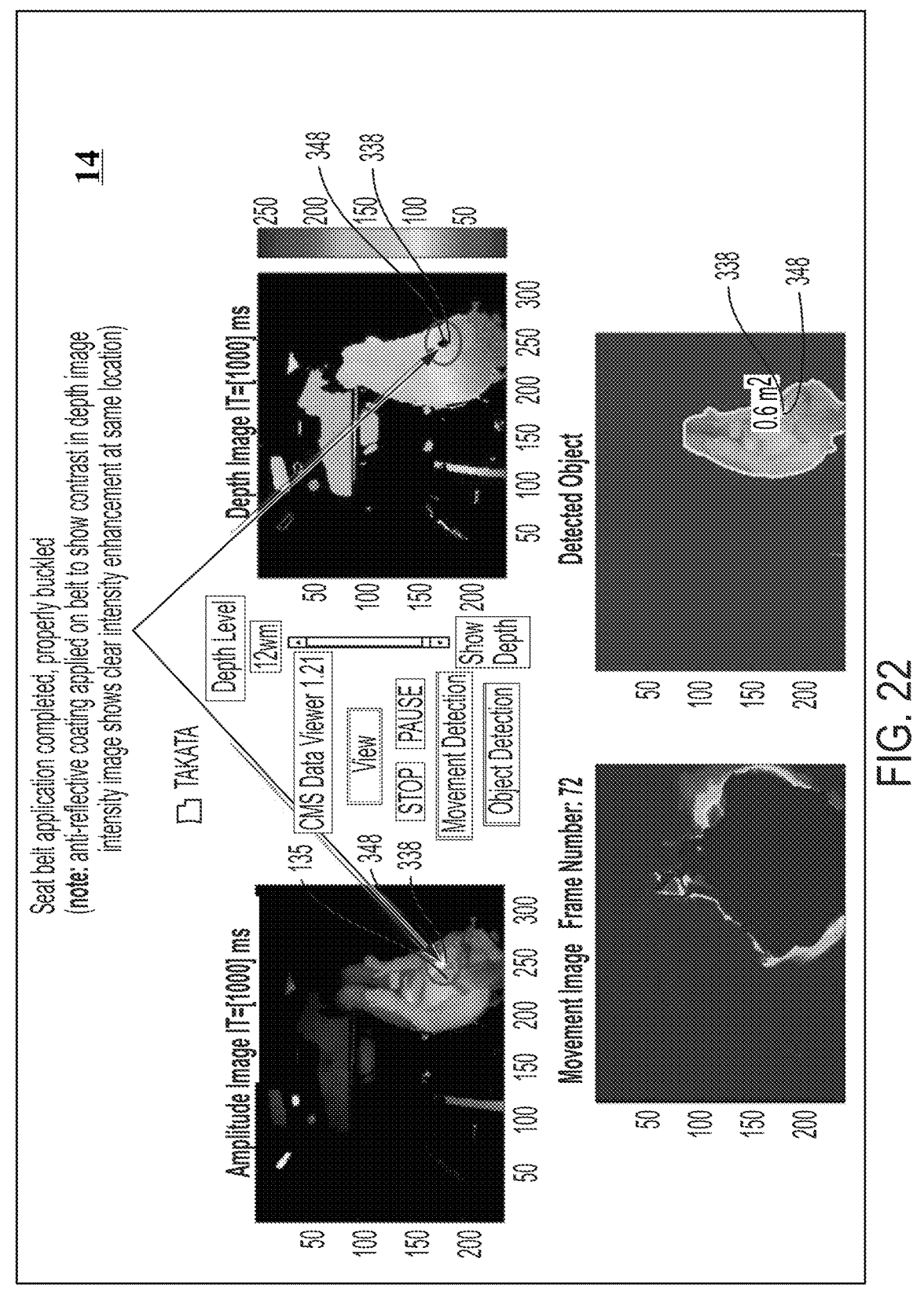

FIG. 22 presents a series of images in respective domains at time T5 of a vehicle interior as set forth in FIG. 15.

DETAILED DESCRIPTION

Overview

Figure 1:
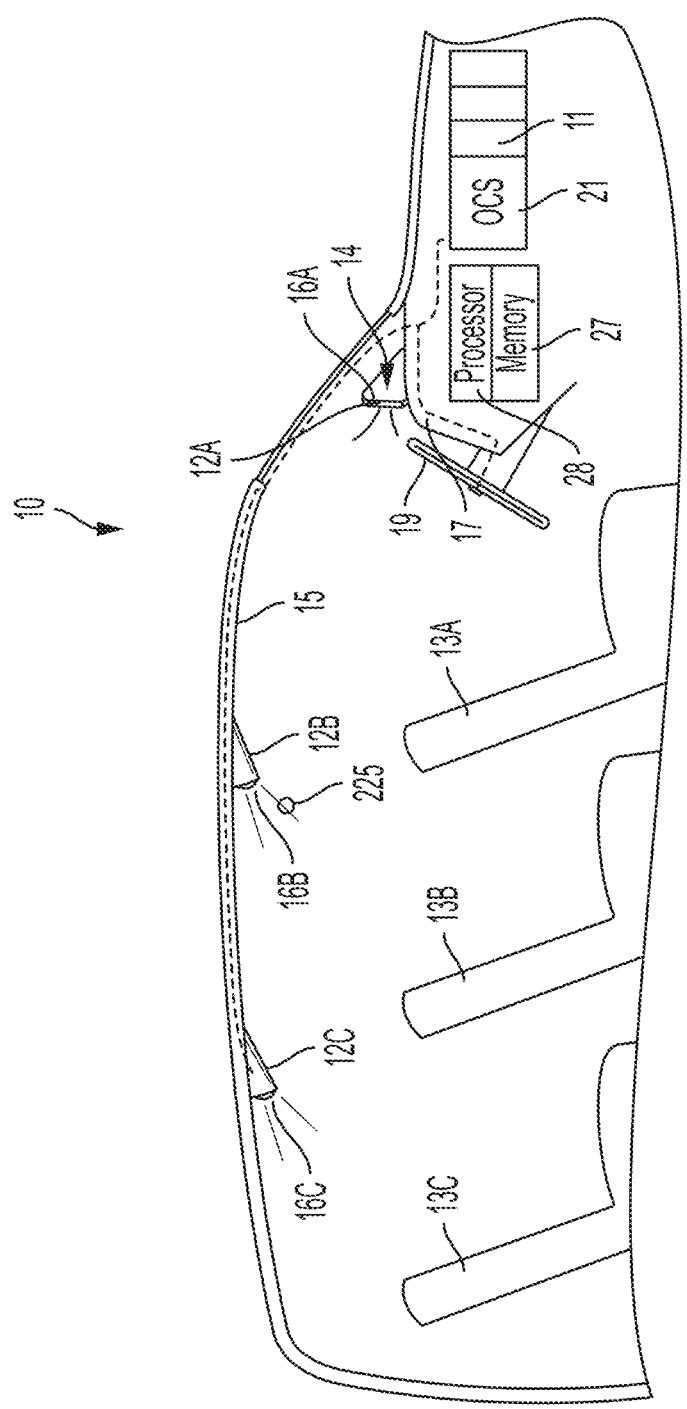
FIG. 1 is a plan view of a vehicle interior having seats installed within respective fields of view of cameras in the vehicle.

This disclosure uses electromagnetic sensor(s) such as image sensors, image cameras, and the like to detect and track positions of numerous components of a vehicle interior. In one embodiment, the sensor is an active optical 3-D time of flight imaging system which emits a known waveform (e.g. sinusoidal, pseudo-random, and the like) of electromagnetic wavelength(s) of light which are collocated and/or synchronized with an imager detector array where the amplitude of the detected signal is proportional to the reflected light at the light wavelength(s). Such a sensor can collect both the reflected light intensity of surfaces in the field of view of the imager and the distance of the surface from the imager detector.

The light is emitted and hits the surface of all objects within a line of sight. As a function of the geometric arrangement and compositional materials of the object, a portion of the light is reflected back toward an imager detector array. Signal processing of the detected signals can be used to reconstruct 3-D information (intensity image and depth image) which can be used in machine vision algorithms to detect, and/or classify, and/or track information about the objects within the scene. In one non-limiting example embodiment, the light source wavelength may be selected within the range of about 850 to 950 nm, and the source of the selected light could be an LED array or VCSEL laser(s) with dispersion/filtering optics to disperse light within a known spatial area.

Without limiting this disclosure to one kind of equipment set-up, the imager array may be, for example, a silicon multi-pixel array synchronized and sensitive to the above described 850-950 nm light emitted from a corresponding light source. However, the sensor and associated sources and detectors could also be based on other electromagnetic methods such as passive optical imagers (2-D, using ambient lighting) radar, ultrasonic, microwave, and numerous detection technologies.

In example embodiments, the image sensors detect and track components of a vehicle interior, including but not limited to a seat belt material, the mechanical mounting of the seat belts (e.g. seat belt payout aperture) and/or mechanical features on the seat belt (e.g., the webbing itself, d-rings, buckle hardware, retention buttons, etc.). These components may be composed of materials and/or augmented with an appropriate pattern such that features within the pattern have a controlled, deterministic reflectivity in the sensor wavelength region(s). Other vehicle components that may be detected and tracked with the imaging equipment described below include portions of vehicle door interiors, portions of vehicle seats and head rests, storage compartments in the front or back seats, and even occupants and/or objects within the vehicle.

For example, in one non-limiting embodiment, the seatbelt material, or webbing, may be the target structure for tracking. The webbing can be woven, coated, sewn, or otherwise embellished with an interchanging pattern of high and low reflectivity materials at the selected sensor wavelength(s). The pattern may be selected to provide improved ability to detect and track information about the seat belt by either visual inspection or by image detection in an automated computer vision system. Machine vision methods can be optimized to detect, classify and track these patterns. Pattern features may be selected for optimal contrast to detect/track extent of seat belt payout from a seatbelt payout aperture, depth of seat belt relative to a sensor or camera, and other comparative data sets, such as which belt position is in a closest position to camera (e.g., to identify the occupant's chest). Embodiments described herein detect, monitor, and/or track seat belt payout apertures and seat belt patterns, wherever located in an image created from a camera field of view. For example, these patterns can be located and their relative positions determined in comparison to seats, roofs or in vehicle side structures used to detect positions of seat belts or portions thereof. In cases where the belt may be obscured, objects brought into a vehicle by the occupant, such as clothing, blankets, luggage, cargo, or anything that the occupant places over an expected area for a seat belt can be accounted for in this system.

The system and methods described herein identify reference points within a space that are significantly less likely to be obscured in a vehicle, providing known structures from which to evaluate safety factors, such as seat belt use, and vehicle operation conditions, such as seat position and occupant position. By identifying reference structures that are always visible within a vehicle, the system and methods disclosed herein take advantage of partially visible portions of a vehicle interior, along with occupant classification methods, to predict proper or improper vehicle operation. As noted, a seat belt assembly is only one example of a kind of structure within a vehicle cabin that may be useful for monitoring by an image sensor as set forth herein. The detailed description below explains more embodiments of the methods and systems for monitoring in accordance with the figures referenced therein.

Active optical sensor systems operate using a determined light source and detector that operate synchronously together. The light source is prescribed to emit light of a determined wavelength range, intensity and duty cycle so that a portion of the emitted light reflects off of objects within the field of view of the detector. The intensity and phase of the light reaching the image sensor, or image detector, can be used to generate a reflected intensity image and also a distance image. The combination of these two is often described as a "point cloud image" that can be used to discriminate objects within the image sensor field of view. In one embodiment, the image sensor has a fixed dynamic range (often described using a voltage range such as 0.5-5 Volts), where voltages that exceed the maximum represent "Saturation" and voltages that fall below the minimum range value represent "Noise", or the electrical noise level of the sensor. In most embodiments, the image sensor is designed to maximize the information that can be detected and used by software configured within the sensor. The intended application of the sensor also determines the intended sensor range. Placing a filter on an image sensor such that the filter allows passage of a desired wavelength range and blocks all others can further improve the sensor signal to noise ratio. By generating successive "point cloud images" as a function of increasing time, the movement of objects within the field of view (FOV) of the sensor can also be estimated and tracked.

For the purpose of this disclosure, one non-limiting example of an active optical image sensor is a 3-D Time of Flight camera that can emit sinusoidal light using LED(s) or laser diode(s) with a center wavelength of approximately 850 nm and a range of +/−50 nm. The camera includes an image sensor having a pass band filter using the same center wavelength of 850 nm (or any other chosen wavelength) and corresponding range so that the image sensor is sampled at two or more equally spaced times during the light source sine wave (DT1, DT2, . . . ). By using a very fast sine wave, compared to the fastest possible movement of objects, the detected "point cloud image" represents a three-dimensional snapshot of the image sensor field of view. The duration for which the camera integrates collected light at these sampling times (e.g. integration times) can also be controlled within the image sensor. The intensity of the light reaching the image sensor is a function of the emitted light wavelength range, intensity and phase, the location (distance) of objects within the field of view, the size and orientation of the objects, and other factors such as the surface characteristics of the objects (e.g. material reflectivity in the sensor detector wavelength range, macroscopic/microscope surface normal, e.g., rough or smooth).

If objects are very close to the image sensor and/or highly reflective, the detected light can exceed the maximum dynamic range of the image sensor (i.e., the sensor becomes "saturated"). By decreasing the integration time, the detected light can be reduced to fall within the image sensor dynamic range. If objects are very far from the image sensor and/or non-reflective, the image sensor may not receive sufficient reflected light to register within the detector dynamic range (i.e., subject to "noise"). By increasing the integration time in this noisy scenario, the detected light can be increased to fall within the detector dynamic range.

To optimize the information from the sensor for the intended application, the full dynamic range of the 3-D TOF sensor should be used, minimizing "saturation" and "noise" conditions.

For the purpose of this disclosure, an example application is defined as a Cabin Monitoring System (CMS). In this non-limiting example, a 3-D TOF sensor is fixed within a vehicle and collects sequential point cloud images which are used by computer algorithms to discretely or continuously monitor the full cabin to the extent that a camera field of view and range make the full cabin view possible. The CMS also encompasses human occupants and objects within the cabin.

For example, in order to detect the depth and intensity of vehicle seats for low reflectivity materials (e.g. black fabric), and to further detect the position of vehicle components within the cabin, the image sensor may require long integration times, or perhaps, may not be able to detect the target materials at all. On the other hand, some seating materials may be extremely reflective resulting in saturation at very low integration times. To account for these scenarios, it may be beneficial to introduce materials in one or more reference objects with a controlled, determined Lambertian surface having a controlled Bi-direction Reflectance Distribution Function (BRDF) such that a collected image provides a consistent reference for the active optical sensor.

The BRDF is a term of art in the field of optics and generally refers to a function of four parameters related to characteristics of reflected light, such as the scattering properties of a surface subject to incident light. In one respect, the BRDF takes an incoming light direction ($w_i$), an outgoing light direction ($w_r$) and returns the ratio of reflected radiance to irradiance incident onto the surface. Each direction is itself parameterized by the azimuth angle, $\phi$, and the zenith angle, $\theta$, therefore the BRDF is a function of 4 variables as set forth below:

$$f_r(w_i, w_r) = \frac{d\ L_r(w_r)}{d\ E_i(w_i)} = \frac{d\ L_r(w_r)}{L_i(w_i)\cos\theta_i\ dw_i}$$

See, Nicodemus, Fred (1965). "Directional Reflectance and Emissivity of an Opaque Surface". Applied Optics. 4 (7): 767-775, cited by Wikipedia.org.

During CMS development for embodiments of this disclosure, several deterministic BRDF reference objects were placed along the inside of a vehicle cabin and on vehicle seats. For test purposes, the reference objects were installed using traditional reflective materials, such as those described above, that must be carefully aligned with the operating parameters of an associated camera/sensor in order to be effective. As such, the test conditions would prove to be difficult to manage and implement in a production setting. Upon proof of concept as shown herein, this disclosure also includes numerous structural features for components within a vehicle cabin to be imaged and corresponding camera functions that allow for high quality imaging of at least a portion of a vehicle cabin.

Many objects within a vehicle cabin have deterministic characteristics relative to an image sensor in a camera installed within the vehicle cabin. For example, in a vehicle as received from an original equipment manufacturer, the roof, sides, doors, seats, windows, hardware positions, degrees of mechanical freedom for dynamic structures such as seat position and tilt angle, along with associated fabrication materials, are specified and fixed within the cabin design. Accordingly, these objects can be predicted, measured and used as reference structures within a point cloud image (deterministic intensity and distance). Currently, component manufacturers for vehicles and/or vehicle components use selected materials for the above noted reference objects without considering the components' detectability by active optical image sensors.

Electrical systems including active optical elements have been developed for vehicle applications including the following:

Seatbelt integrated microphones and sensors
Seat belt buckle switches, presenters and illuminators
Steering wheel integrated visible light bars
Infrared illuminators for driver monitoring systems Imaging operations within a vehicle cabin may also account for images that incorporate the above noted electronics displayed therein. For any electronically connected component within a vehicle interior, there is potential to include components and/or operational modes where an active optical illuminator (e.g. LED) is integrated and activated such that the illuminator is visible to a 2-D or 3-D active optical sensor as described in this disclosure. The lighting characteristics (wavelength such as infrared, intensity, duration, pattern) are controllable based on a vehicle and/or occupant state.

As such, the 2-D or 3-D active optical sensor can detect, classify and monitor illumination from multiple sources for a variety of purposes by locating an illuminator in a sensor image (2-D) or point cloud (3-D) based on intensity, spatial position, and/or temporal pattern (e.g. flashing at a known rate). Without limiting the disclosure to any particular embodiments, an illuminator as used herein may be a passive illuminator that reflects incident light or an active illuminator that is a powered light source. For example, a camera may gather an image that shows turning an illuminator "on" when a vehicle state changes and detecting this through the illuminator state change in one or more pixels within the active optical sensor image. Other kinds of illuminators subject to this example include a dome light that goes "on" when the door is open and "off" when the door is closed, such that the position of the dome light relative to an image sensor in the camera is fixed (or at least constrained to a pre-determined number of degrees of freedom). Detection and tracking of the light can be used as a calibration reference or a redundant measure of door open/close status (independently of a door switch) to provide enhanced functional safety.

Other examples of illuminators within a vehicle that may be captured by an image sensor include:

i. Lights on a vehicle door may move through the sensor image space in a determined pattern to indicate door movement and position state ii. Seat buckle or D-ring illuminator(s) are visible to the sensor when seats are in an un-occupied state and those lights are obscured during the ingress/egress process for occupants or objects, confirming a seating state change.

iii. Seat buckle or D-ring illuminator(s) are not visible during occupant belt adjustment and closure, but visible when properly latched.

v. Illuminator(s) in the seatbelt are turned on when seat-belts are latched and can be used to determine if they are worn (visible by the sensor) and/or further determine occupant stature (position/distance from the sensor) relative to a seat belt.

vi. Steering wheel illuminators used to determine steering wheel position/tilt state, hand sensing state (obscured, not obscured) and potentially the steering wheel angle (positions of illuminators relative to the camera).

Any visible and controllable illuminator within the sensor field of view can be used and controlled in this way to help determine a vehicle and/or occupant state. As noted above, the illuminator includes reflective illumination devices and active light sources that may, in some embodiments, utilize a power source. In any event, an illuminator will have optical qualities and characteristics that are consistent with the purposes of this disclosure.

A-priori knowledge of the illuminator(s) position relative to the sensor, lighting intensity and pattern can be used as calibration references to improve the accuracy and resolution of machine vision detection, classification and tracking algorithms.

These and other embodiments of this disclosure follow in the detailed description and the figures as set forth below.

FIG. 1 is an overview schematic of a vehicle according to this disclosure including rows of seats (13A, 13B, 13C) within the vehicle interior (10), or vehicle cabin, of a vehicle. The term "vehicle" as used herein includes all of the broadest plain meanings for the term within the context of transportation (i.e., any references to an automobile are for example purposes only and do not limit this disclosure to any one embodiment). The vehicle of FIG. 1 incorporates a driver' seat (13A) adjacent a steering wheel (19) and a common driver's control panel (17) (possibly including a viewing screen). The vehicle control system is not shown separately but would be implemented within a computer bank that includes processors (28), memory (27), electronic circuits, and at least one sensor necessary to establish a safe driving environment in the vehicle interior (10). The computers (11) in the vehicle may communicate with occupant classification systems (21) used to determine the entry/exit location, anatomy, age, adult/child/infant status, and other quantitative/qualitative characteristics of each occupant in the vehicle. The vehicle of FIG. 1 would typically include standard equipment from original equipment manufacturers (OEMs) such as seat belt assemblies shown in more detail in other figures. The vehicle of FIG. 1, however, illustrates installation of cameras (12A, 12B, 12C) having respective light sources (16A, 16B, 16C) and positioned in the vehicle interior (10) to establish respective fields of view (225) of occupants, seats (13), seat belt assemblies (20A, 20B), and other structures in the vehicle. In this non-limiting example, the cameras/image sensors (12) (also known as optical sensors (12)) have been installed on the ceiling (15) of the vehicle and atop the driver's control panel (17). The vehicle includes the associated circuitry to connect the cameras (12), working in conjunction with light sources (16) and associated arrays/sensors (hereinafter "image sensors" (14)), to a vehicle control system operating via a computer bank of computers (11).

Figure 2:
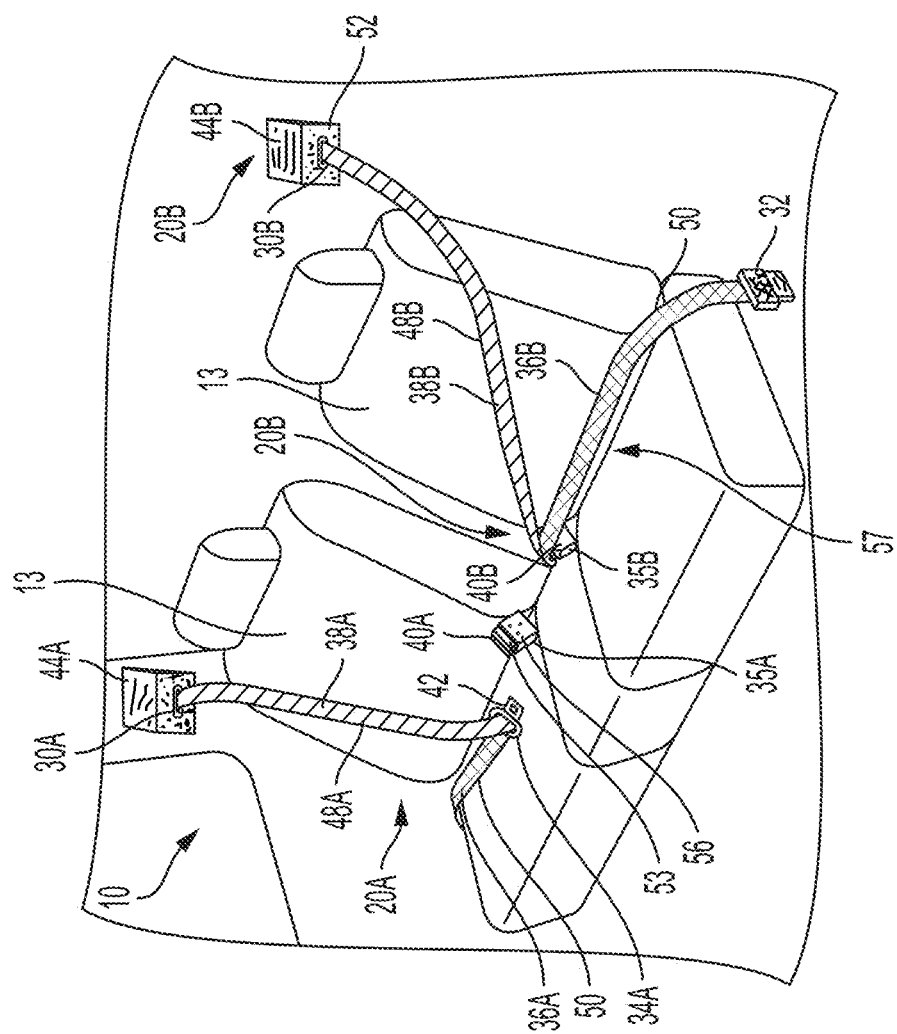
FIG. 2 is a perspective view of a seat belt assembly having reflective patterns thereon as described herein.

FIG. 2 illustrates more details about the vehicle interior (10) and the seats (13A, 13B, 13C) with seat belt assemblies (20A, 20B) operating therein. One non-limiting aspect of this disclosure includes utilizing components within the vehicle interior (10), such as but not limited to a seat belt assembly (20A, 20B) in a way that maximizes monitoring capabilities. The components within a vehicle interior (10) that may be detected and tracked according to the embodiments of this disclosure may include, but are not limited to, a seat belt retractor assembly (i.e., a spool that unwinds and re-winds the seat belt into a webbing payout section (44)), a payout aperture (30) through which a seat belt extends, a portion of a seat belt assembly configured as a shoulder strap (48), a lap strap (36), a lap belt anchor (32A, 32B, 32C), web length adjustment hardware (34), a buckle (40), buckle hardware (35), a seat belt tongue (42), at least one face (46) of the seat belt buckle (40), and peripheral hardware used to install or enable the seat belt assembly functions (e.g. d-rings, retention buttons). The term "seat belt hardware" is not intended to be limiting of this disclosure and includes any structure of the seat belt assembly that provides any kind of connection, installation, or operation function relative to the lap strap and shoulder strap shown in FIG. 2.

At least these components and other objects and items identifiable within a vehicle interior (10) may include patterns that are integral with, applied to, or manufactured with a respective component. The patterns are designed of materials having a known reflectivity such that the pattern is distinguishable in an intensity and/or distance image taken of the vehicle interior (10). A pattern having a pre-determined reflectivity due to its material composition shows up with a distinguishable luminance (or visible intensity) sufficient to distinguish the pattern from other structures in an image. The pattern may show up in an image as either a lower luminance region or a higher luminance region at the preference of the designer and continue to be useful for distinguishing components of the seat belt assembly. In FIG. 2, components of the seat belt assembly (20) show respective shoulder strap patterns (38), lap belt patterns (50), webbing payout section patterns (52), buckle aperture patterns (53), buckle pattern (56), and different patterns on opposite sides of components (i.e., opposite sides of the lap strap and shoulder strap having different patterns can identify a twisted position for a seat belt in an associated image).

FIG. 2 illustrates certain components that may always be significantly visible in the vehicle interior (10) even when an occupant or an occupant's belongings obscure other portions of the seat belt assembly from the camera field of view. For example, a webbing payout section (44) such as an area defined within a b pillar in a vehicle may be installed at multiple sites within the vehicle interior to provide a pay-out of an associated seat belt across an occupant. The associated payout aperture (30) would typically be visible to a properly positioned camera. Other kinds of components that are less likely to be hidden by cargo and usually visible within a sensor or camera's field of view include the seat belt buckle (40), which has a known range of motion.

Figure 3:
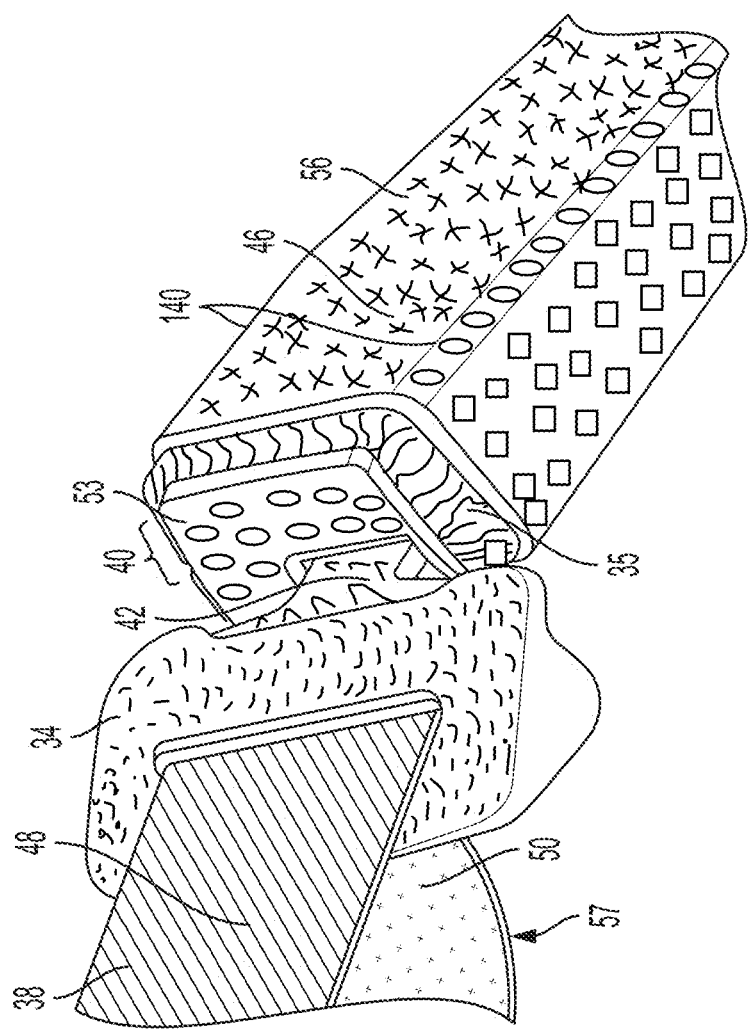
FIG. 3 is a perspective view of seat belt buckle hardware in a buckled position with a seat belt tongue affixed thereto.

FIG. 3 illustrates a blown-up view of a seat belt buckle having respective patterns on certain sub-components of the buckle component. For example, a shoulder strap (48) has a first shoulder strap pattern (38) on one side that can be identified as stripes and a second shoulder strap pattern (57) on an opposite side. In the example of FIG. 3, the opposite side of the shoulder strap is also visible as a lap belt pattern (50) for an associated lap belt (36). The buckle (40), the tongue (42), buckle faces (46), and web length adjustment hardware (34) are all viable candidates for having an identifiable pattern thereon.

Figure 4:
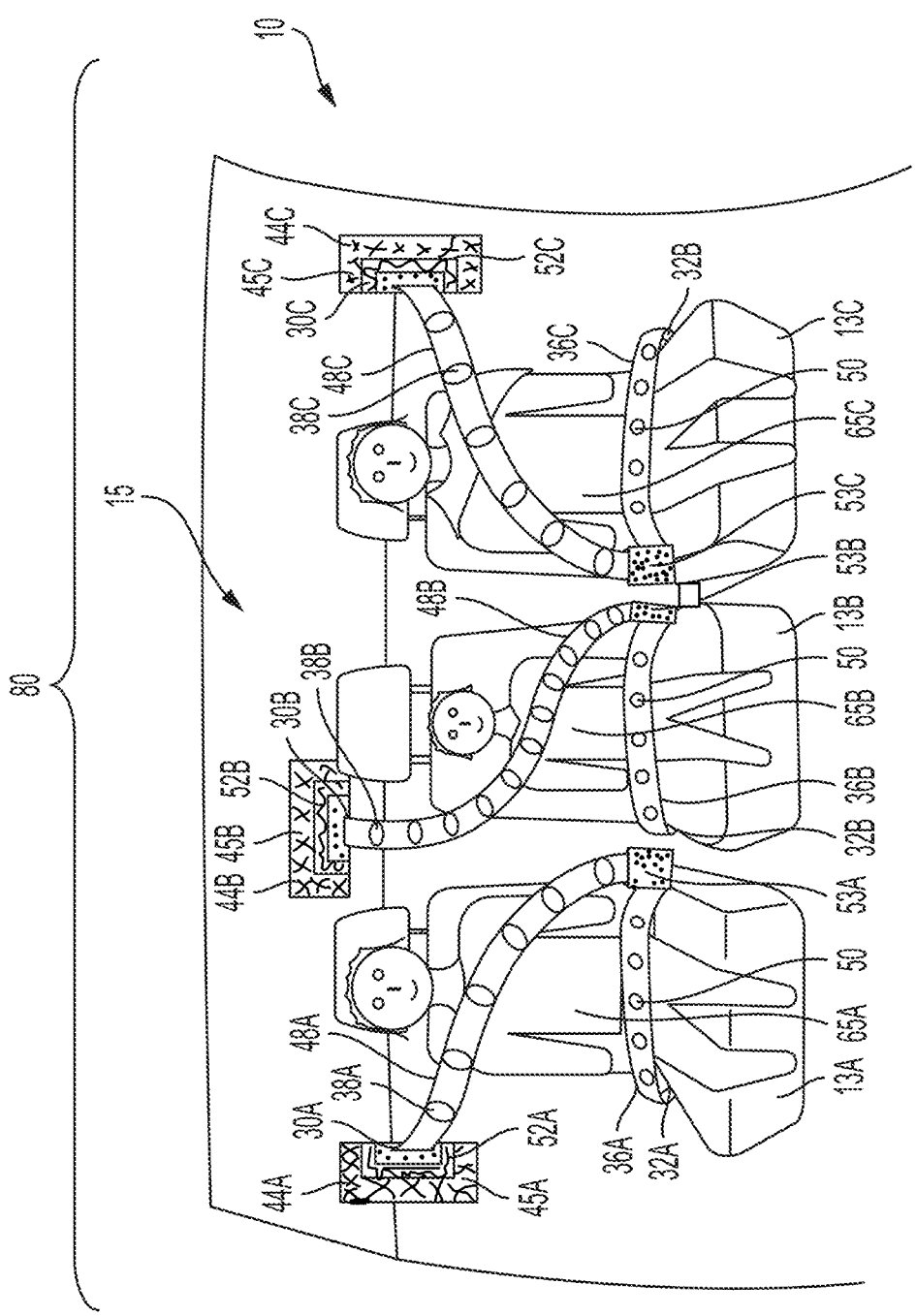
FIG. 4 is a representative 3-D image captured by the cameras of FIG. 1.

FIG. 4 shows one example embodiment of at least three seat belt assemblies (20) in use within a vehicle interior (10), and each seat belt assembly is operable with a respective seat (13A, 13B, 13C) having a different occupant therein. As would be true in most scenarios, the occupants are distinctive in both size, shape, and dimensions that can affect proper seat belt position for each occupant. The image of FIG. 4 illustrates an example of one kind of image (80) that a vehicle camera (12) (or an appropriate system of multiple cameras) can produce from a properly tuned light source (16) illuminating the vehicle interior (10) at a wavelength of electromagnetic radiation/light waves that has been selected to correspond to the capturing sensitivities and resolution of an image sensor (14) receiving reflected light back from materials and objects within the camera field of view.

The image gathered and processed by the image sensor (14) may be either a two dimensional or three dimensional image, depending on the camera, the computerized image array, and the associated computer processors, but the patterns on the seat belts, anchor points, and retractors are visible therein. The payout aperture (30) within each webbing payout section (44) is illustrated with a significantly prominent payout section pattern (52) outlining the aperture so that an origin of seat belt payout may be distinguishable in the image. The webbing payout sections (44A, 44B, 44C), shown as respectively mounted cases, may have a different pattern (45A, 45B, 45C) to further illuminate the structure of the retractor assembly. The remaining structures of FIG. 4 show the use of respective patterns on the seat belt assembly as discussed above. The components may include, but are not limited to, a seat belt retractor assembly (i.e., a spool that unwinds and re-winds the seat belt into a webbing payout section (44)), a payout aperture (30) through which a seat belt extends, a portion of a seat belt assembly configured as a shoulder strap (48), a lap strap (36), a lap belt anchor (32), web length adjustment hardware (34), a buckle (40), buckle hardware (35), a seat belt tongue (42), at least one face (46) of the seat belt buckle (40), and peripheral hardware used to install or enable the seat belt assembly functions (e.g. d-rings, retention buttons). A shoulder strap (48) has a first shoulder strap pattern (38) on one side that can be identified as stripes and a second shoulder strap pattern (57) on an opposite side. In the example of FIG. 3, the opposite side of the shoulder strap is also visible as a lap belt pattern (50) for an associated lap strap (36). The buckle (40), the tongue (42), buckle faces (46), and web length adjustment hardware (34) are all viable candidates for having an identifiable pattern thereon. The structures in the image and the associated patterns provide data to accomplish multiple functions—particularly classifying occupants pursuant to an associated occupant classification system ("OCS") (21), calculating spatial measurements relative to known references within the vehicle, and tracking movement within the vehicle. One goal is to identify that a lap strap and shoulder belt for the seat belt assembly cross an occupant at correct locations on the torso (65) to achieve a proper buckled/unbuckled state from sensors in the buckle.

The occupant classification system ("OCS") (21) may include numerous kinds of hardware, position sensors, pressure sensors, weight sensors, and the like to identify a vehicle occupant so that a vehicle meets regulatory requirements. Many traits of an occupant are currently identified by an OCS to assist in controlling air bag deployment as well as other restraint systems, alerts, and operational control signals. In non-limiting embodiments of this disclosure, images gathered pursuant to the methods and systems herein may be used in conjunction with an OCS to identify proper seat belt placement for many different levels of human development (e.g., adult, child, infant) as well as anatomy structures (large male, average male or female, small female). Optimal seat belt placement for these diverse occupants will be significantly different for each. An OCS may receive data from the computerized imaging systems described herein to conduct edge analyses to detect occupant forms, 3-D depth analyses for torso position, and anatomical dimensioning for seat belt confirmation relative to the occupant's body. Single camera and multi-camera systems for both seat belt monitoring and occupant classification are well within the scope of this disclosure.

Figure 5:
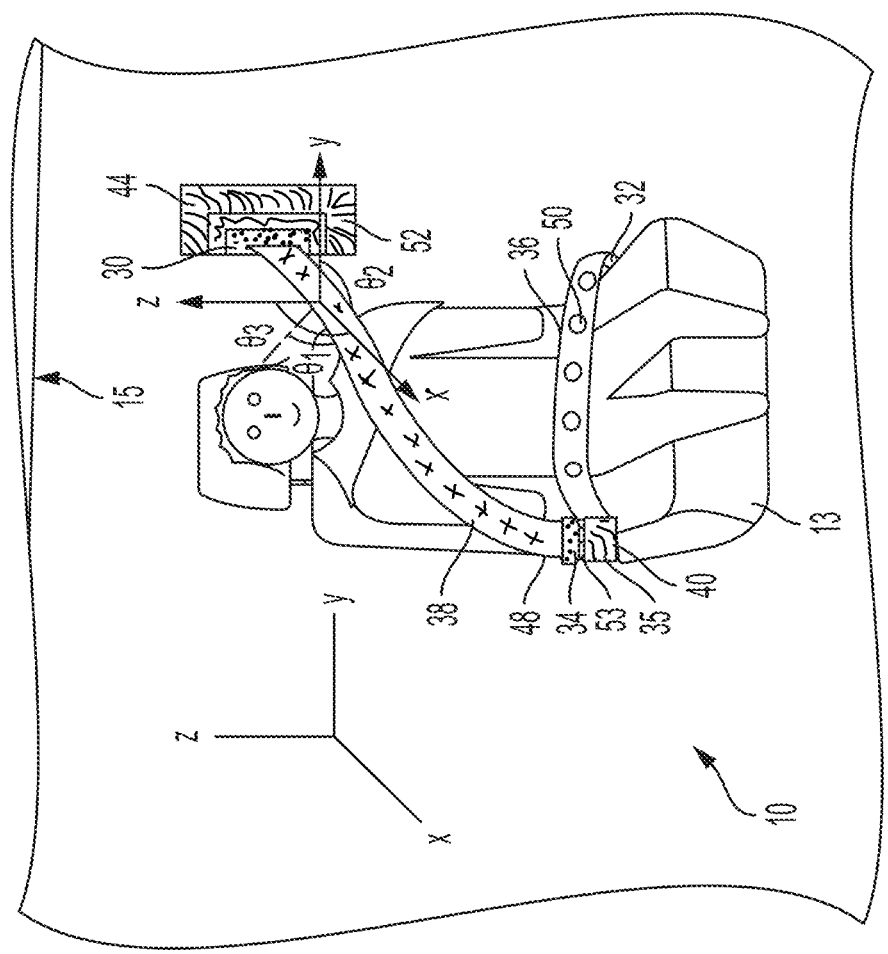
FIG. 5 is a portion of the image of FIG. 4 cropped for a particular region of interest.

FIG. 5 illustrates an example of a three-dimensional analysis of a vehicle occupant in a vehicle seat (13) and utilizes the above noted components of the seat belt assembly (20). An image as shown may be constructed with sufficient levels of detail to distinguish patterns on numerous components of the seat belt assembly, such as the shoulder strap pattern (38) and/or the lap belt pattern (50). The components of the seat belt assembly as well as the occupant's body is shown with sufficient clarity to model the interior of the vehicle at this seat (i.e., at this region of interest) in a three-dimensional coordinate system. Such mapping to a coordinate system allows for computer software to calculate spatial measurements for each frame of an image as well as tracking motion across pairs of images. In the non-limiting example of FIG. 5, a computerized method implemented by the system disclosed herein calculates numerous angles useful in identifying proper seat belt use or improper seat belt use. The spatial measurements may include distances from a camera (12) to a portion of the occupant's body (i.e., torso receiving a shoulder strap), distances between components of the seat belt assembly (20) and portions of the occupant's body, and angles between structures within the vehicle, the occupant's body, and the seat belt assembly.

For example, without limiting this disclosure, FIG. 5 illustrates a method of calculating a first angle (Theta 1) between an occupant's shoulder and a longitudinal axis along the seat belt, a second angle (Theta 2) between the longitudinal axis of the seat belt and a referenced horizontal axis for the coordinate system, a third angle (Theta 3) calculated between a portion of the occupant's head and the longitudinal axis of the seat belt. These kinds of static measurements are mere examples of the system gathering data points to use in determining beginning, intermediate, and final positions of seat belt components in a respective vehicle. This data can then be used to prepare and issue associated alerts or warnings to the occupants, control air bags and other restraint systems, and update data to help an OCS verify classifications of occupants in the vehicle.

The above-described disclosure has described apparatuses and techniques for (i) establishing identifiable patterns associated with a seat belt assembly and corresponding vehicle structures and (ii) providing imaging techniques that incorporate known reference values under numerous conditions, in regard to both fixed and dynamic structures within a vehicle.

Structures in a vehicle may be either fixed or dynamic at different times. In one sense, certain components considered to be fixed in a vehicle include the fixed components of the seat belt assembly (20) such as at least one of a webbing payout section (44) that defines a seat belt payout aperture (30), a seat belt buckle (40), a first anchor point (32A), and buckle hardware (35) connected to the fixed components. Dynamic components may include at least one of a seat belt extending from an aperture (30) in a webbing payout section (44), a shoulder strap (48) portion of the seat belt, a lap belt (36) portion of the seat belt, and a seat belt tongue (42) because these items are likely to move during use and be in different positions from one occupant to another. Other components may have limited ranges of motion as described above (e.g., a seat (13) or a seat belt buckle (40)) so that while being adjustable in a dynamic sense, that same component can serve as a fixed component reference point if a selected position is known.

Using multiple cameras, multiple reference points, and properly placed patterns of distinct reflectivity accommodates a system that not only provides static spatial measurements of distances and angles, but also provides movement information for an occupant or a vehicle structure relative to a known or calculated reference point.

The iterative frames of FIGS. 18-28, discussed in detail below, illustrate using these techniques for a time series motion analysis of an occupant interacting with a seat belt assembly 20 (from a reference point such as a seat belt payout aperture (30)) with the webbing payout (e.g. shoulder strap (48A, 48B) and lap belt (36A, 36B) each having at least one predetermined pattern (38, 50)). With these reference points and associated measurements and images, the system is adapted to account for numerous occupant positions (i.e., lying down versus sitting normally, entering and exiting vehicle, and proper seat belt position relative to the occupant's body during use). The system is further configured to adjust calculations for proper seat belt use accordingly. In one embodiment, the reference points can be used with imaging analysis to identify a seat belt pattern showing seat belt slack across an occupant that is not suitable for proper and safe seat belt use.

Successive images from the at least one camera (12) are analyzed to track occupant motion within a region of interest, wherein the motion is relative to at least one of the fixed components in the vehicle. Occupant motion data derived from the images is utilized by the processor (28) to track occupant physiological processes, including but not limited to at least one of breathing, respiration rate, heart rate, mouth opening and closing, blinking, and speech patterns. Some of these measurements may be validated by the processor (28) in conjunction with computer implemented software stored in associated memory (27) further calculating a seat position within the region of interest relative to the reference measurement of the fixed component. The processor (28) and the memory (27) may be local to the vehicle or remotely accessed on a wireless network.

Figure 15:
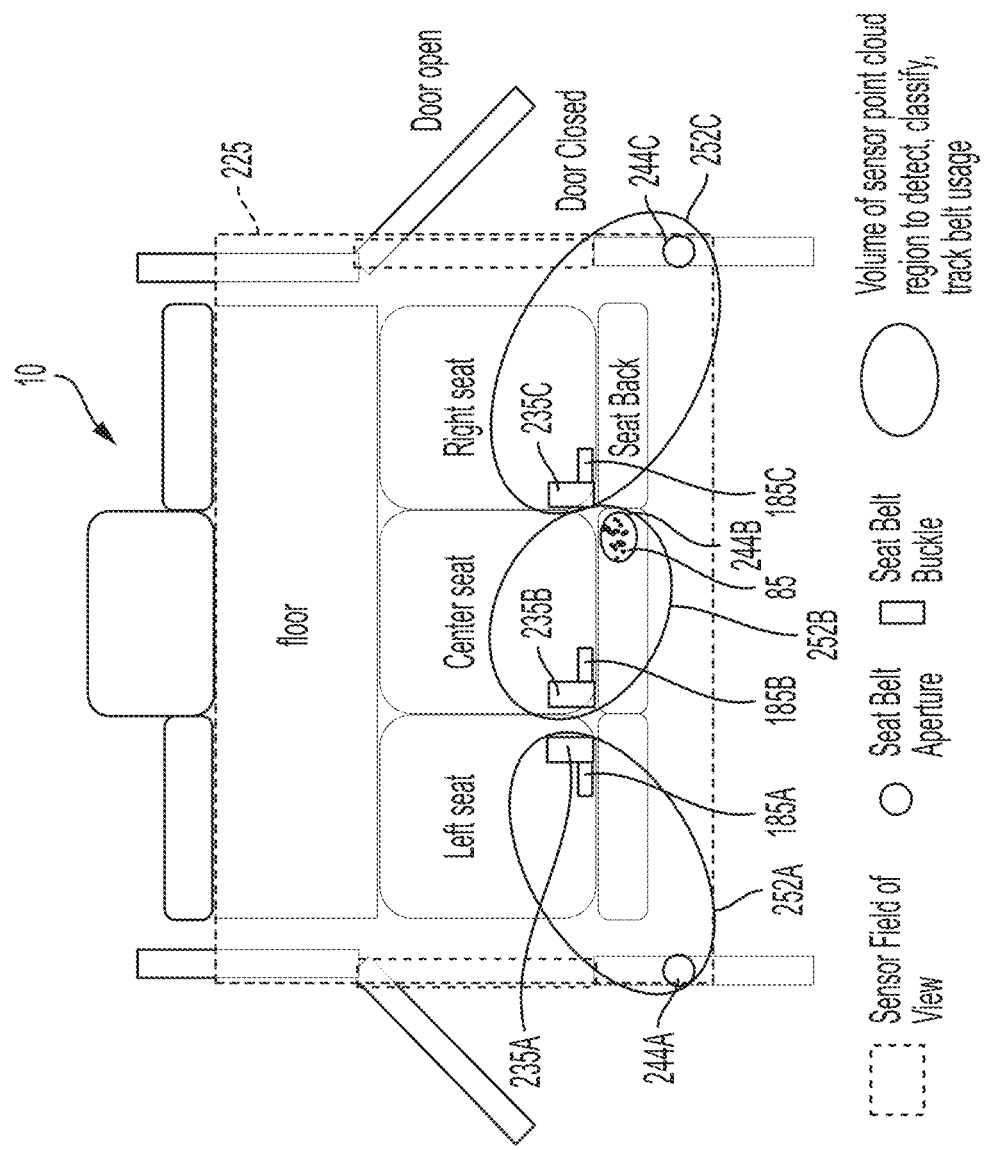
FIG. 15 is a top perspective view of a vehicle interior as imaged by a sensor having a field of view as set forth herein.

Referring to FIG. 15 as a first example of this disclosure as installed in a vehicle, one aspect of this disclosure shown in the attached figures includes the above referenced apparatuses, systems, and methods of controlling reflectance and integration time for a given image sensor (14) collecting image data from an illuminated surface (85) or an illuminating device (185) within a field of view (225). In this example, the illuminated surface may be a retroreflective layer applied onto a vehicle component or retroreflective surface integral with the vehicle component. For example, as shown in the installation of FIG. 15, a webbing payout section (244B) may incorporate a retroreflective surface (85), and illuminating devices (185A, 185B, 185C) may be respective light sources, each positioned within the field of view, on a different vehicle component such as seat belt buckle hardware (235A, 235B, 235C).

Figure 6:
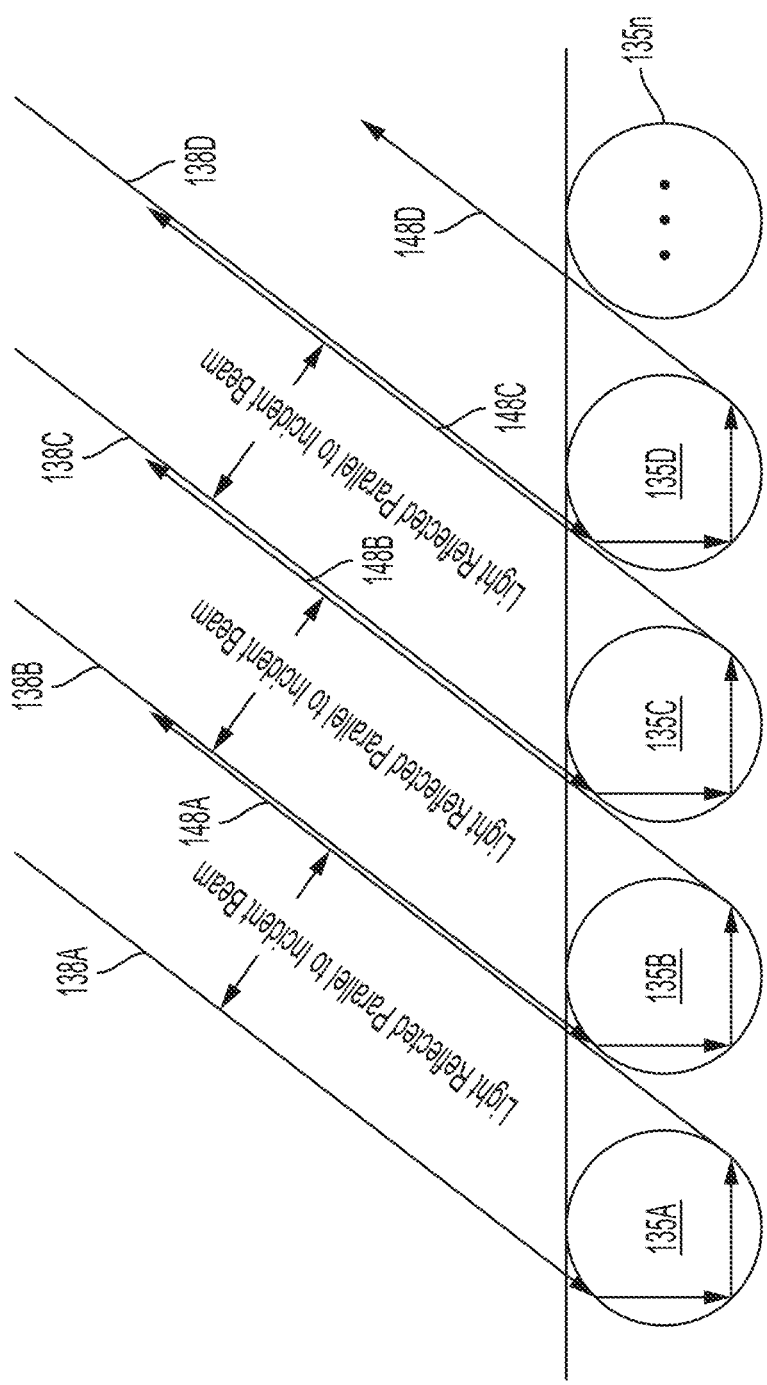
FIG. 6 is a schematic representation of retroreflective surfaces and associated light reflection as set forth in this disclosure.
Figures 7A, 7B:
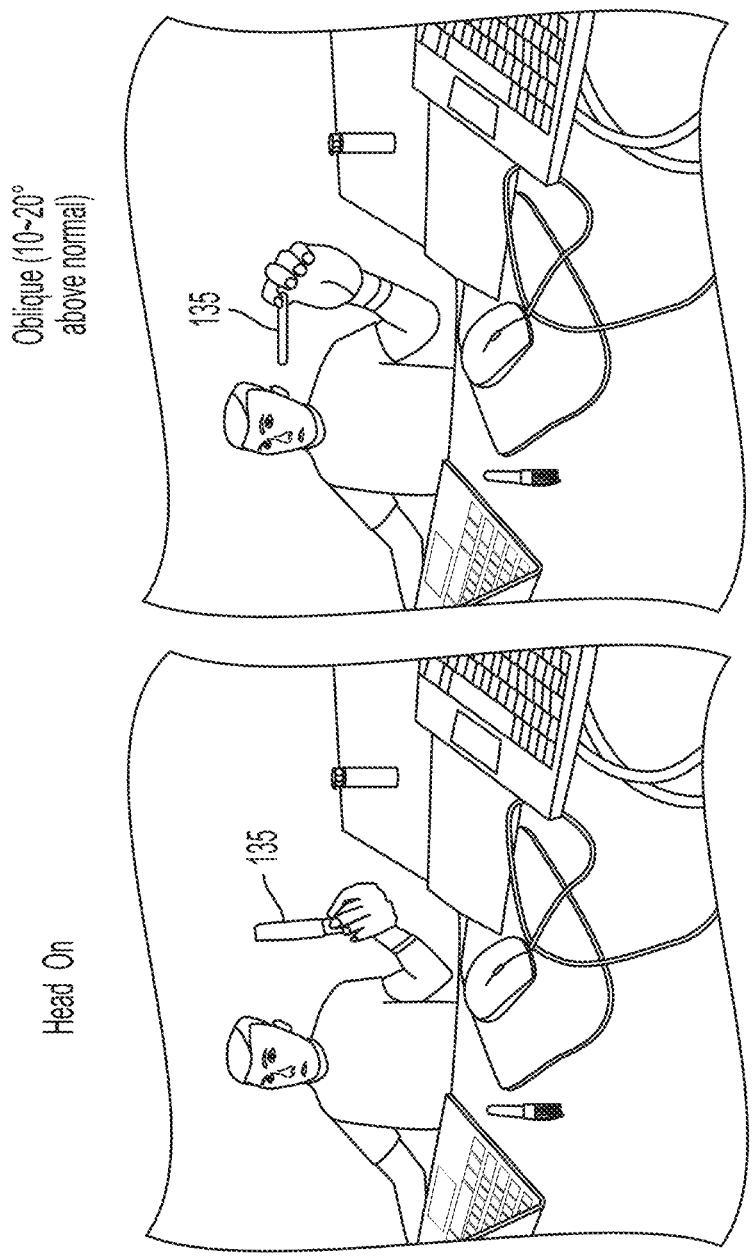
FIG. 7A is a perspective view of a retroreflective surface subject to illumination and imaged in a head on orientation as disclosed herein.
FIG. 7B is a perspective view of a retroreflective surface subject to illumination and imaged in an oblique orientation as disclosed herein.

Returning to FIG. 6, this figure illustrates that one of the concepts included in this disclosure is that retroreflective materials, such as but not limited to, a retroreflective applique, a retroreflective fabric, or even retroreflective fibers and threads can make up part of a vehicle component such as the illuminated surface (85) as shown in FIG. 15. As illustrated in FIG. 6, a retroreflective surface (135A-135n) is subject to illuminating light having incident beams (138A-138D) of projected light providing reflected beams (148A-148D) by the retroreflective surface parallel to the incident beam. As shown in FIGS. 7A and 7B, a retroreflective surface (135) comprises a material that is still highly reflective even at large angles. In the example of FIG. 7B, the retroreflective surface (135) is highly reflective at oblique angles (about 10 to about 20 degrees above normal) that approach parallel to the normal.

Figure 8:
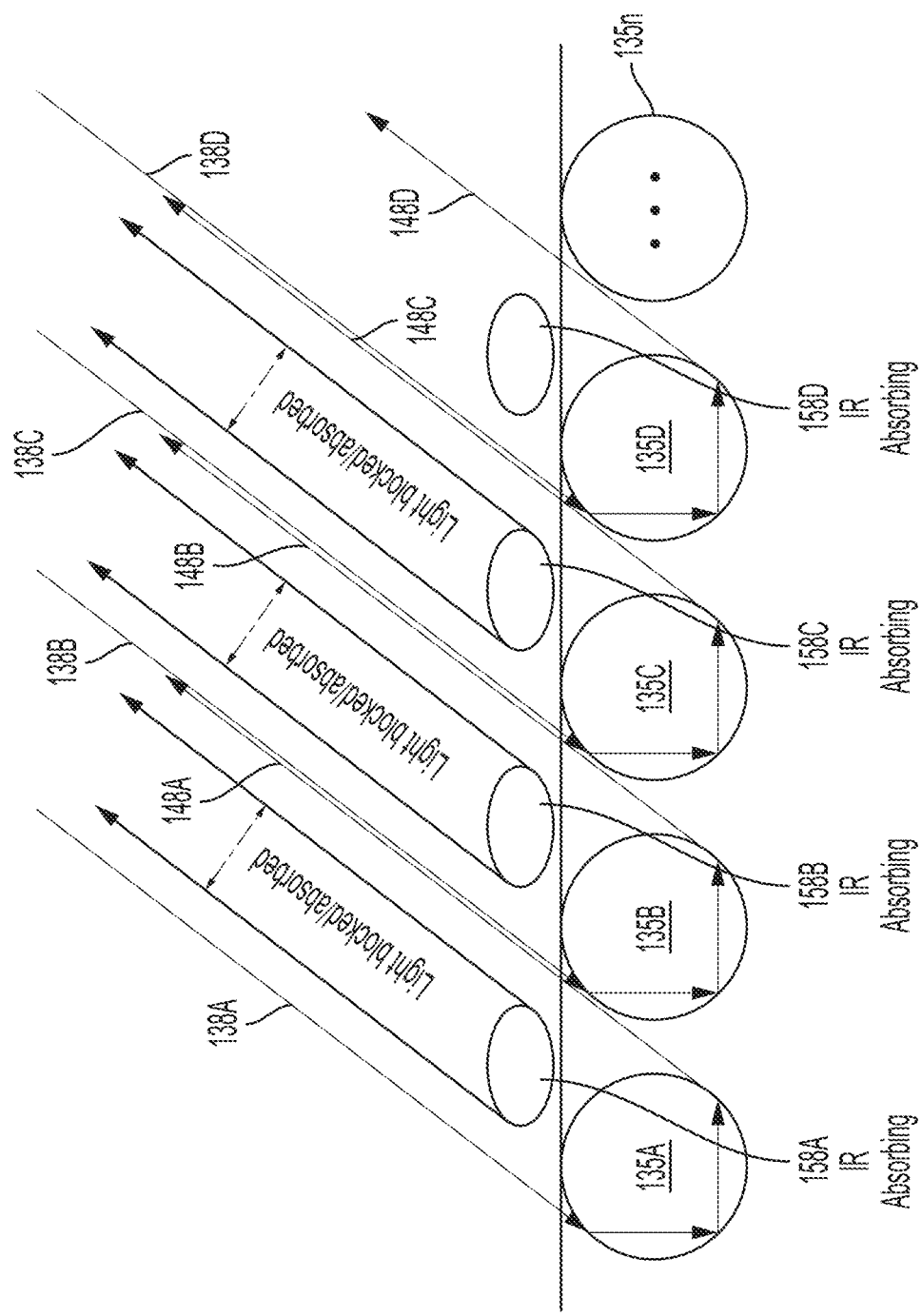
FIG. 8 is a schematic representation of retroreflective surfaces incorporating blocking structures absorbing infrared illuminating light as disclosed herein along with associated light reflection as set forth in this disclosure.

As noted above, certain vehicle components will utilize reflective regions to ensure that physical features of a given vehicle component are discernible in an image resulting from the system described herein. The retroreflective regions may be created after vehicle construction by applying separate retroreflective layers (140) onto a vehicle component, such as a retroreflective layer (140) applied to the seat belt buckle of FIG. 3. In other embodiments, the retroreflective regions may be retroreflective surfaces (135) that are integral with the body of the vehicle component at hand such as the fibers forming retroreflective surface (135) of FIG. 6. Either a retroreflective layer or a retroreflective surface may, in certain embodiments, present an issue of saturating an image sensor or incorporating noise into image data, depending on the reflectance and component position relative to an image sensor (14). FIG. 8 illustrates one non-limiting solution to the saturation problem in that a light absorbing structure (158A-158D) can be positioned over or upon a retroreflective surface (135) to control the reflected light (148A-148D). The absorbing structure can be engineered to absorb or at least partially absorb certain wavelengths of light and reflect certain wavelengths at a known quantity of light having predetermined characteristics in a reflected beam (148A-148D). The reflected beam (148A-148D) is configured to fall within a desired range for intensity and wavelength for a given image sensor (14) to provide a high-quality image from incident light thereon.

To take advantage of light characteristics that can be configured for a particular reflected beam (148A-148D), this disclosure incorporates the above noted absorbing structures (158A-158D) into materials that can be used with retroreflective surfaces (135) and retroreflective layers (140) to control numerous characteristics of reflected light (e.g., intensity and wavelength) directed to an image sensor (14). For example, as shown in FIG. 9A, a retroreflective material (190) in the form of a film may be modified with a pre-engineered blocking structure (158) in the form of a mesh layer (210) to provide a desired reflected light beam (148) back to an image sensor (14). As illustrated in FIG. 9B, after placing the mesh (210) onto the retroreflective material (190) and subjecting the modified retroreflective surface (145) to light that arrives perpendicularly to the retroreflective surface, a head-on directed light beam of a given wavelength and intensity will produce an attenuated reflected beam (215) from the modified retroreflective surface. For example, the mesh layer (210) may be configured to absorb certain wavelengths in the infrared portion of the light spectrum as shown in FIG. 8. By modifying the retroreflective surface (135) with a blocking structure such as, but not limited to a mesh (210), a reflected light beam (148A-148D) resulting from an incident light beam (138A-138D), arrives at an image sensor (14) at a preferred intensity, phase, and/or wavelength. As shown in FIGS. 9B and 9C, an attenuated reflected beam (215) may be adjusted according to incident angle of light thereon for a known result in terms of retro-reflectance and image data processed from the retroreflective surface. The "head-on" incident light (FIG. 9B) and the incident light arriving at an oblique angle (FIG. 9C) can be engineered to provide image data that is appropriate to avoid saturation and noise levels for an image sensor (14).

Figure 10:
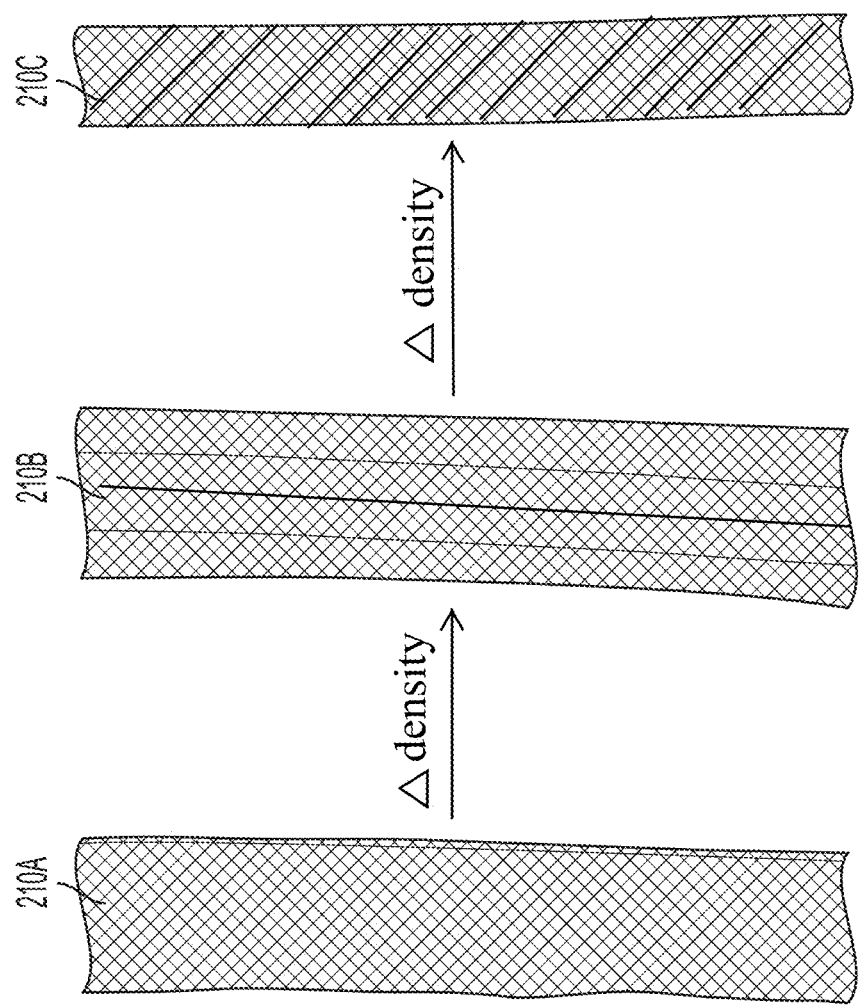
FIG. 10 is a top plan view of a mesh blocking structure of varying cell density as disclosed herein.
Figure 11:
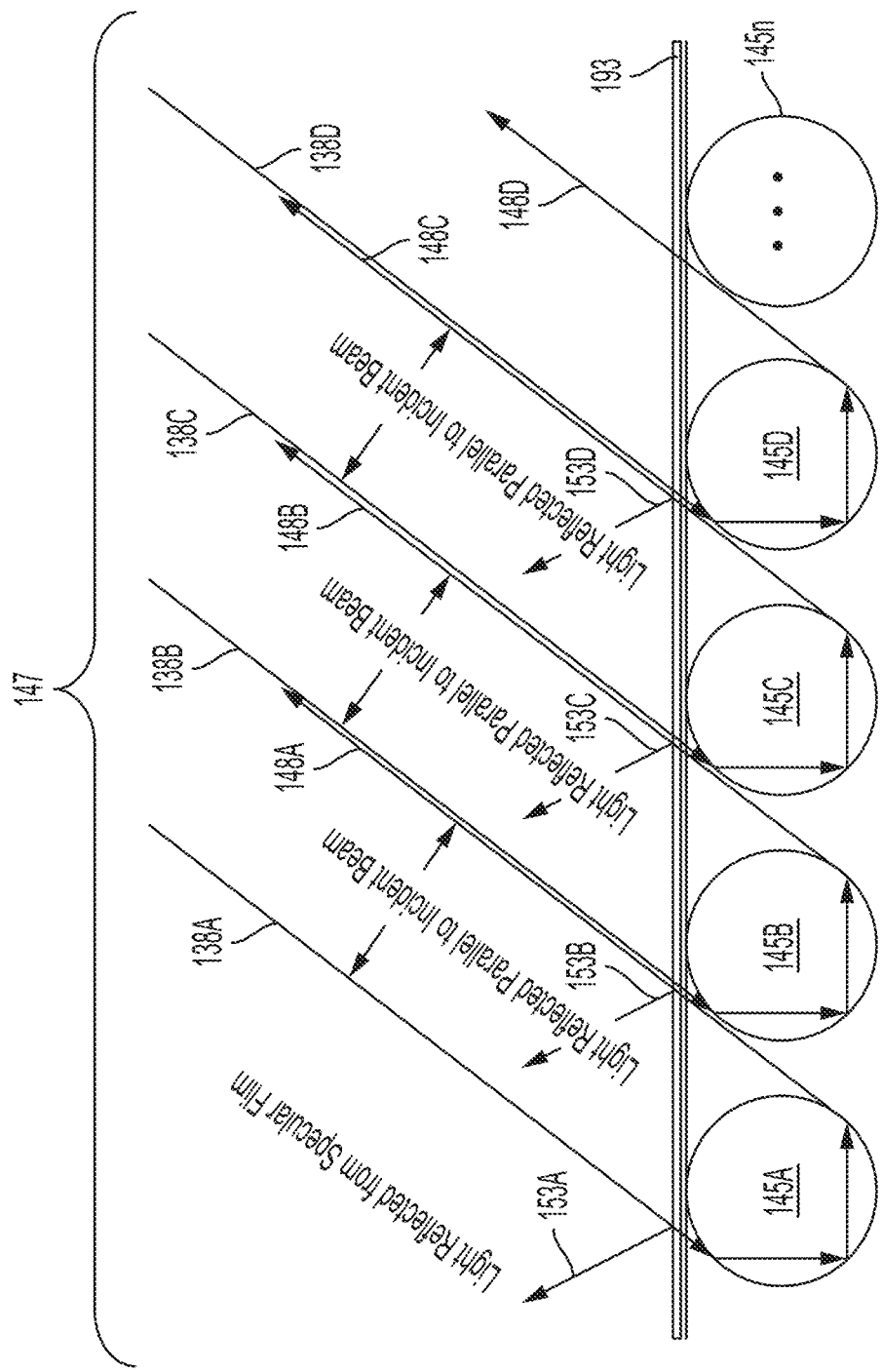
FIG. 11 is a schematic representation of retroreflective surfaces incorporating thin film modified surfaces receiving illuminating light as disclosed herein along with associated light reflection as set forth in this disclosure.

FIG. 10 illustrates that one way of engineering and controlling retroreflectance with a blocking structure is by controlling the absorptive features of that structure, such as the meshes of varying density (210A, 210B, 210C), each of which can be tailored to provide a known absorption rate for a given wavelength of light. In other embodiments, the blocking structures may be considered optically attenuating fabrics. In this sense, the blocking structure is an optically attenuating layer comprising first and second fabric layers having respectively defined optical attenuation factors. FIG. 11 and FIG. 12 illustrate certain physical characteristics of reflected light (148A-148D) in a modified retroreflective surface (145A-145D) that has a given and previously engineered overall reflection pattern (147) when a specular film (193) is placed onto a retroreflective region. In the presence of incident light (138), the film (193) also produces dispersed reflected light (153A-153D) at preferred wavelengths. In one non-limiting example, the preferred reflection pattern is formed by modifying a retroreflective surface (135) with a thin film. FIG. 12A illustrates that a purely retroreflective material (190) can be modified to include a thin film (193) over the retroreflective material (190), and the thin film may be a top layer of known absorption properties such as a clear tape (196). As illustrated in FIG. 12D, the top layer may be a mylar layer (199). FIG. 12E shows that various thin film modifications (193, 196, and 199) to the retroreflective material (190) may each have a pre-engineered reflection response as shown in FIG. 12E for an incident beam (138) arriving "head-on" or perpendicular to the underlying component surface (200) as well as for incident beams (138) arriving at an oblique angle as shown in FIG. 12F. In regard to the oblique angle of FIG. 12F, the retroreflective material (190) with the top layer thin film (193) has almost zero reflection whereas a modification of thin film (193) with a clear tape (196) and mylar layer (199) have varying degrees of absorption occur when the angle is oblique relative to the light angle of incidence. The effect on retroreflectance may range from minor modification to removing the retroreflective behavior of the material all together. The materials illustrated in FIGS. 12A-12F are non-limiting examples used for test purposes. Other materials, absorptive properties, and retroreflectance properties would be within the scope of this disclosure. Overall, one concept in this disclosure shows that retroreflectance of a given surface can be used to synchronize reflected light properties with image sensor operating parameters to maximize the quality of image data collected and to minimize problems with saturation and noise.

Figure 13A:
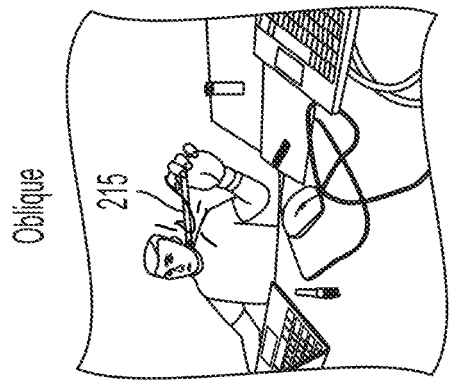
FIG. 13A is a perspective view of a retroreflective surface subject to thin film modification and illumination in a head on orientation as disclosed herein.
Figure 14A:
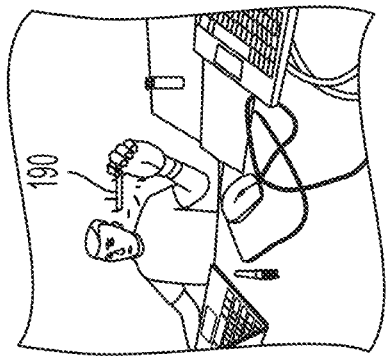
FIG. 14A is a perspective view for comparative analysis of FIG. 13A and showing a retroreflective surface that is not subject to thin film modification and subject to illumination in a head on orientation as disclosed herein.
Figure 13B:
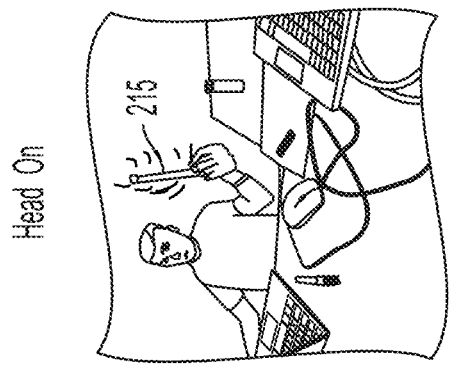
FIG. 13B is a perspective view of a retroreflective surface subject to thin film modification and illumination in an oblique orientation as disclosed herein.
Figure 14B:
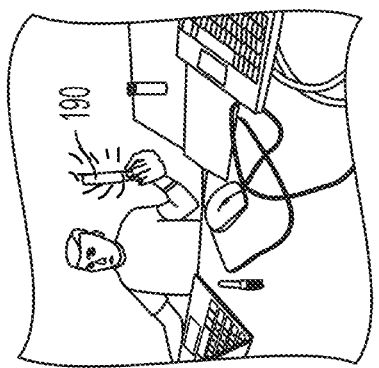
FIG. 14B is a perspective view for comparative analysis of FIG. 13B and showing a retroreflective surface that is not subject to thin film modification and subject to illumination in an oblique orientation as disclosed herein.

FIGS. 13A, 13B, 14A, and 14B present test results in a summary fashion. In FIGS. 14A and 14B, an unmodified retroreflector shows true retroreflectance at both a "head-on" light angle of incidence and an oblique angle approaching parallel to the oncoming light. FIGS. 13A and 13B show the results for head-on and oblique angles of incidence for modified retroreflectors as disclosed herein. These materials indicate the range of opportunities to utilize retroreflective layers (140) and retroreflective surfaces (135) with retroreflective materials (190) to tailor retroreflectance and reflectance properties for vehicle components within vehicle cabin as described herein.

FIGS. 15-28 illustrate how retroreflectance can be used to enhance image data to track vehicle components and occupants within a vehicle by using embodiments of this disclosure. FIG. 15 shows a top view of the vehicle interior (10) and delineates a field of view (225) that may be present from a camera (12) having an image sensor (14). Regions of the vehicle cabin interior may be divided into volumes of sensor point cloud regions (252A, 252B, 252C) to detect, classify and track seatbelt usage or other dynamic components and static components. These regions include example vehicle components that may be tracked by imaging, such as but not limited to seat belt buckle hardware (235A, 235B, 235C) and web payout sections (244A, 244B, 244C) with web payout apertures (230). The components may include patterns that take advantage of retroreflective surfaces, retroreflective layers, modified retroreflective layers and surfaces, and blocking structures such as the meshes discussed above. The components may also make use of illuminating devices (185) that provide light emanating from a vehicle component and which is detectable by the image sensor (14). Numerous embodiments of this disclosure incorporate features explained above in regard to FIGS. 2-5 in addition to FIGS. 15-28, which are included herein only as examples and without limiting the scope of the disclosure. Vehicle components may incorporate patterns that assist an image sensor (14) in detecting, identifying, and tracking positions for seats (13), light sources (16), steering wheels (19), seat belt assemblies (20), web payout sections (44), web length adjustment hardware (34), buckle hardware (35), lap belts (36), shoulder straps (48), seat belt buckle (40), seat belt tongue (42). Each of these components, among others within a vehicle interior (10) may be reference structures such as seats (13), seat belt assemblies (20) and other components noted above. The system disclosed herein may include respective optically active components such as patterns of reflective and/or retroreflective surfaces (135) and/or modified retro-reflective surfaces (145), and/or illuminating devices (185) that show up in image data for processing by image processing software. The image data software reconstructs at least one view from the field of view (225) as an image of the vehicle interior (10) including any of the above noted reference structures and patterns.

Figure 16:
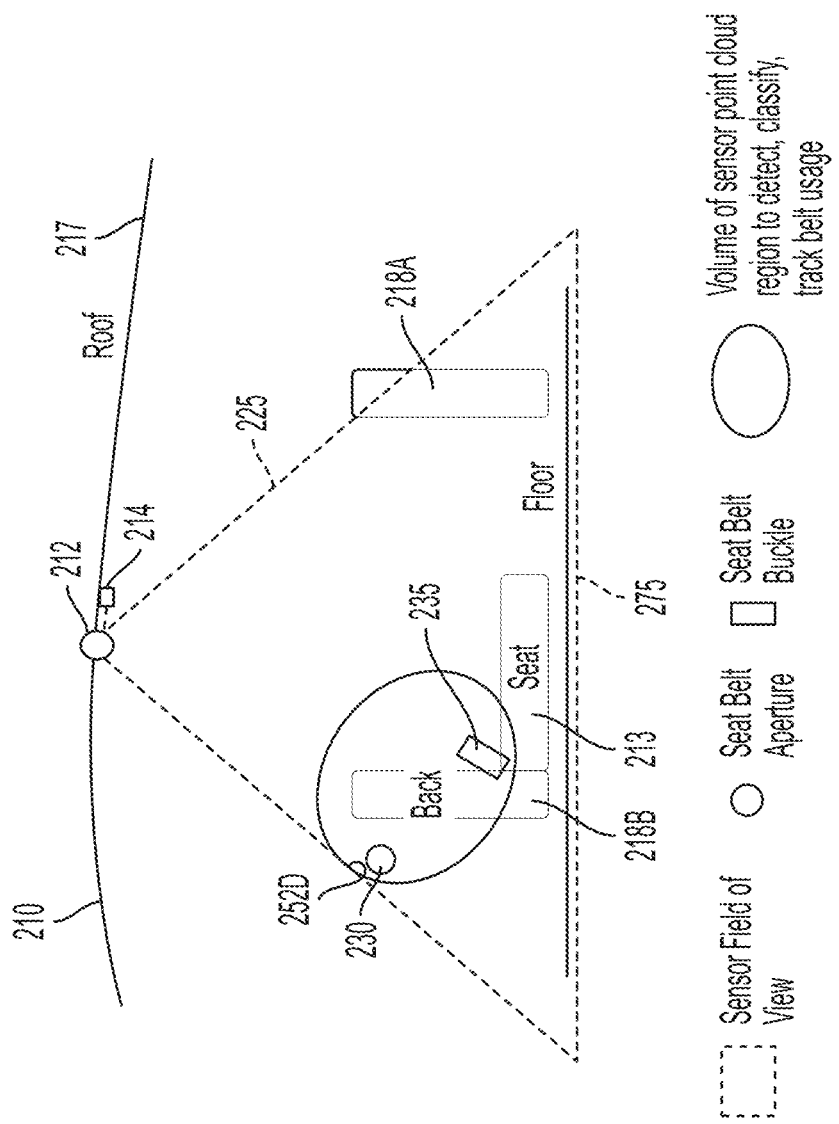
FIG. 16 is a side plan view of the vehicle interior of FIG. 15.
Figure 17:
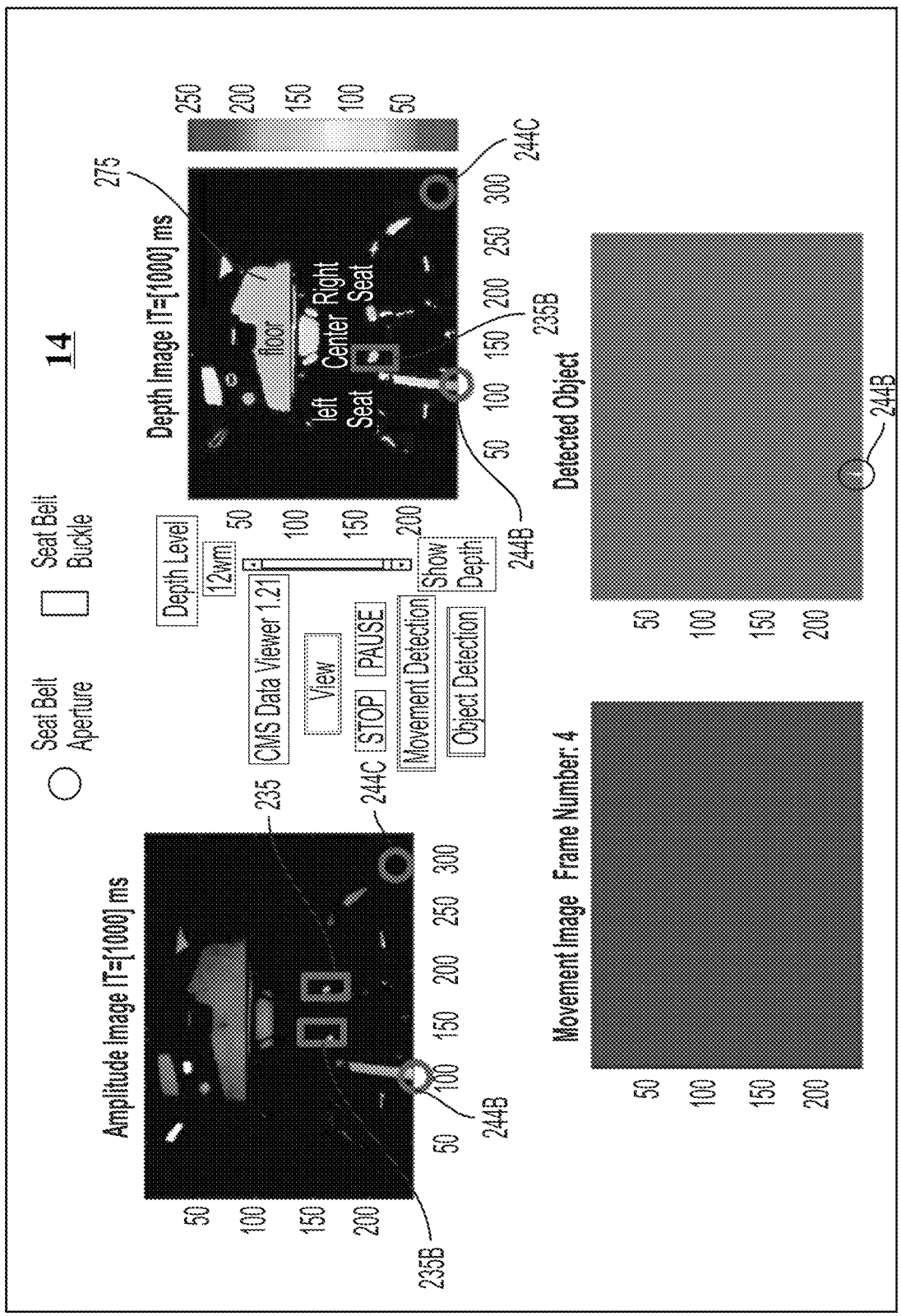
FIG. 17 presents a series of images in respective domains at time T0 of a vehicle interior as set forth in FIG. 15.

FIG. 16 shows a different perspective of a vehicle interior (210) including a camera (212) with an image sensor (214) positioned on a roof (217) or ceiling of the vehicle interior. In this side view of FIG. 16, the field of view (225) may be considered a triangular region for developing a point cloud image that includes a vehicle seat (213), portions of a seat back (218A, 218B), and the above noted seat belt payout aperture (230) and seat belt buckle hardware (235) noted herein. In the non-limiting example of FIG. 16, the schematic circle (252D) illustrates a volume of a sensor point cloud region to detect, classify, and track seat belt usage with an image from the image sensor (214).

Figure 18:
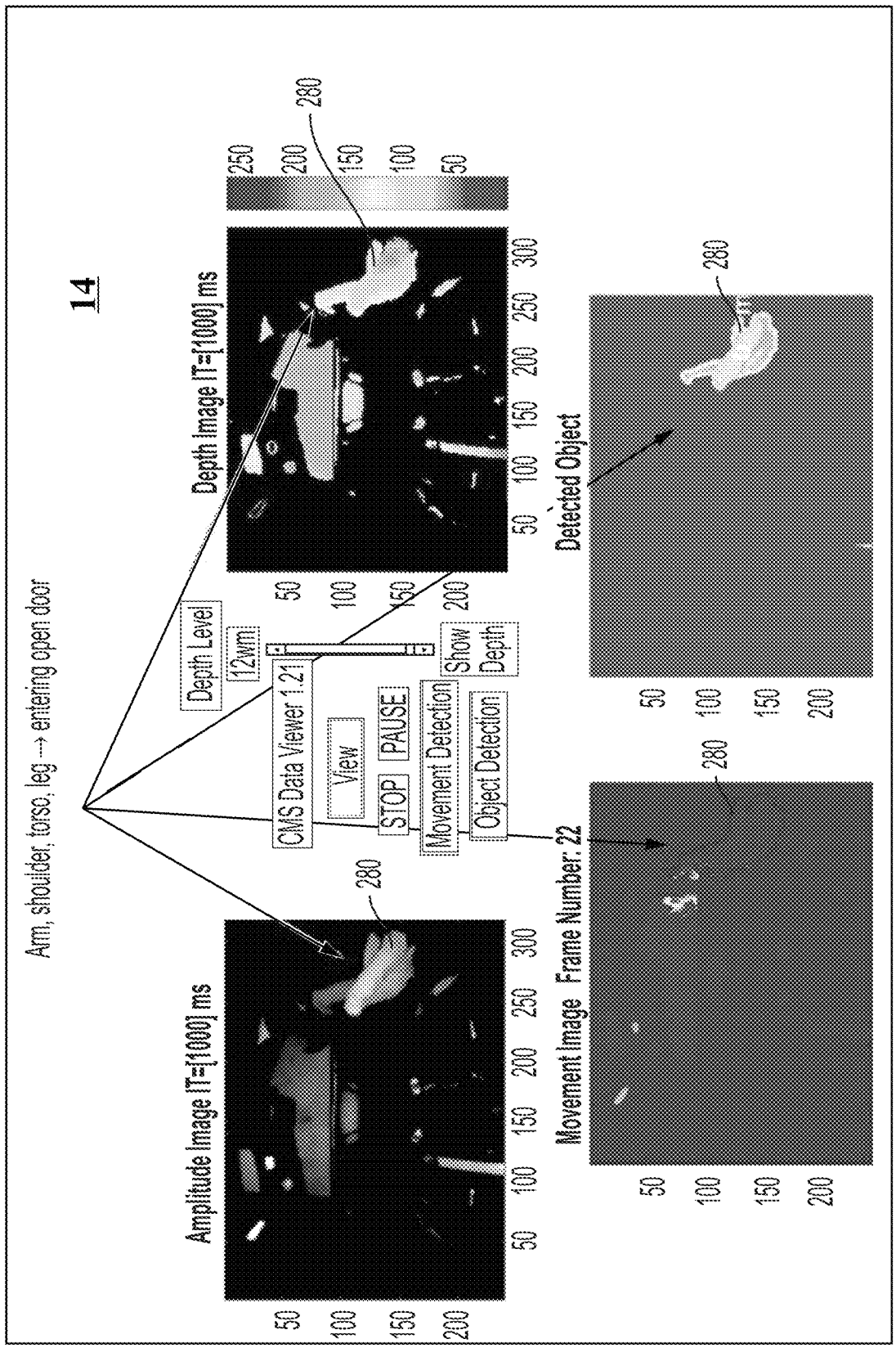
FIG. 18 presents a series of images in respective domains at time T1 of a vehicle interior as set forth in FIG. 15.
Figure 19:
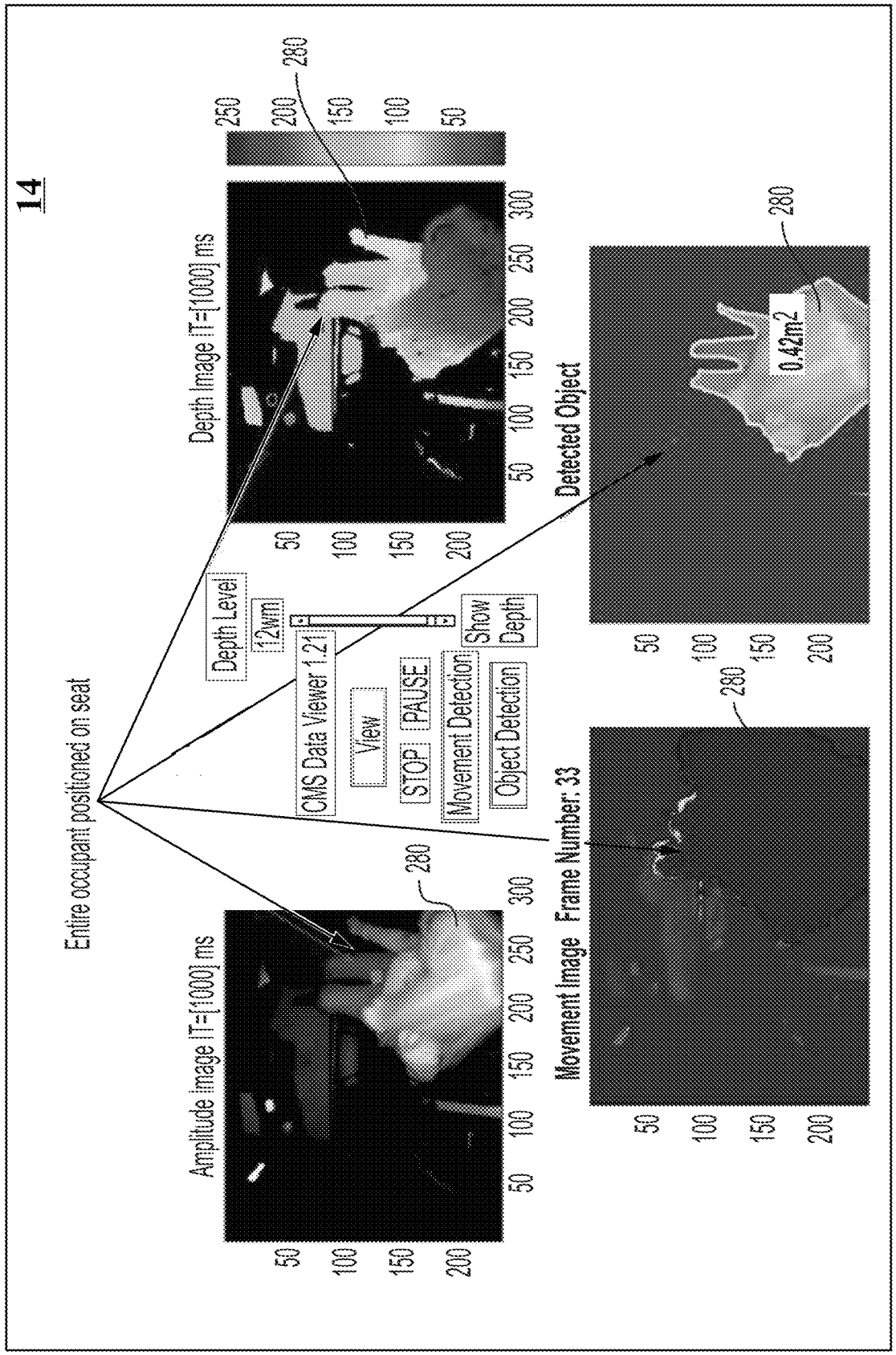
FIG. 19 presents a series of images in respective domains at time T2 of a vehicle interior as set forth in FIG. 15.
Figure 20:
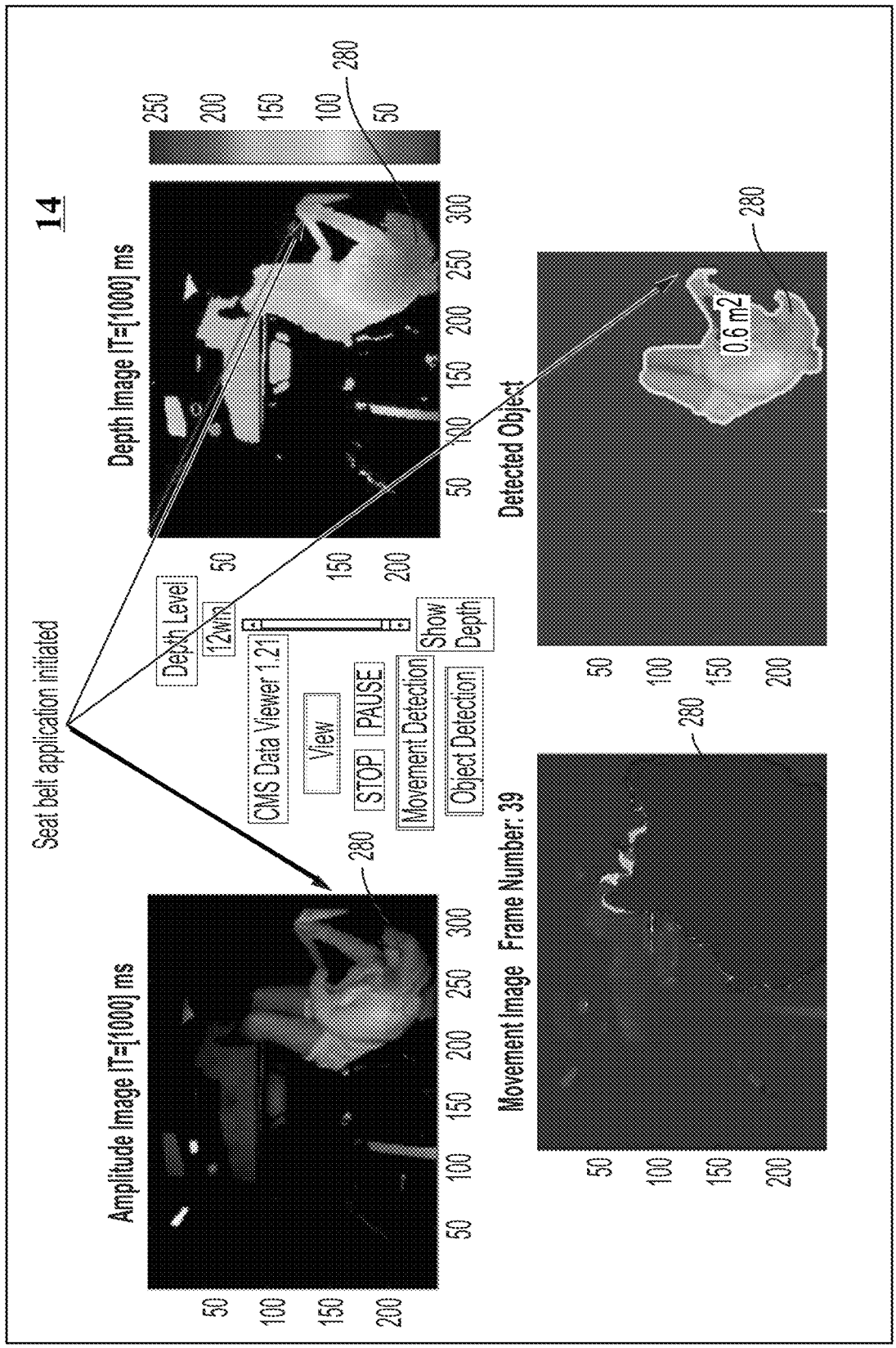
FIG. 20 presents a series of images in respective domains at time T3 of a vehicle interior as set forth in FIG. 15.
Figure 21:
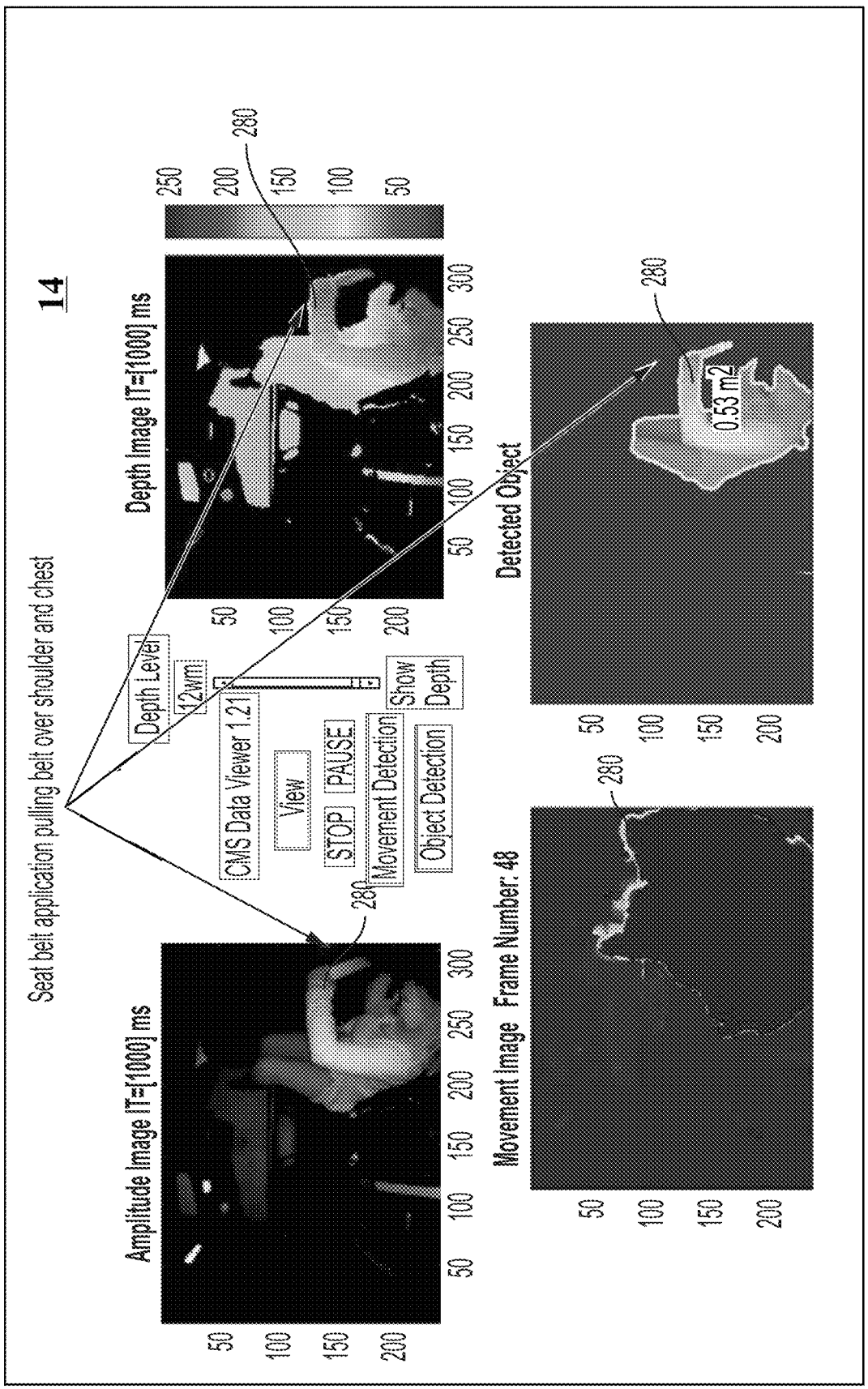
FIG. 21 presents a series of images in respective domains at time T4 of a vehicle interior as set forth in FIG. 15.
Figure 23:
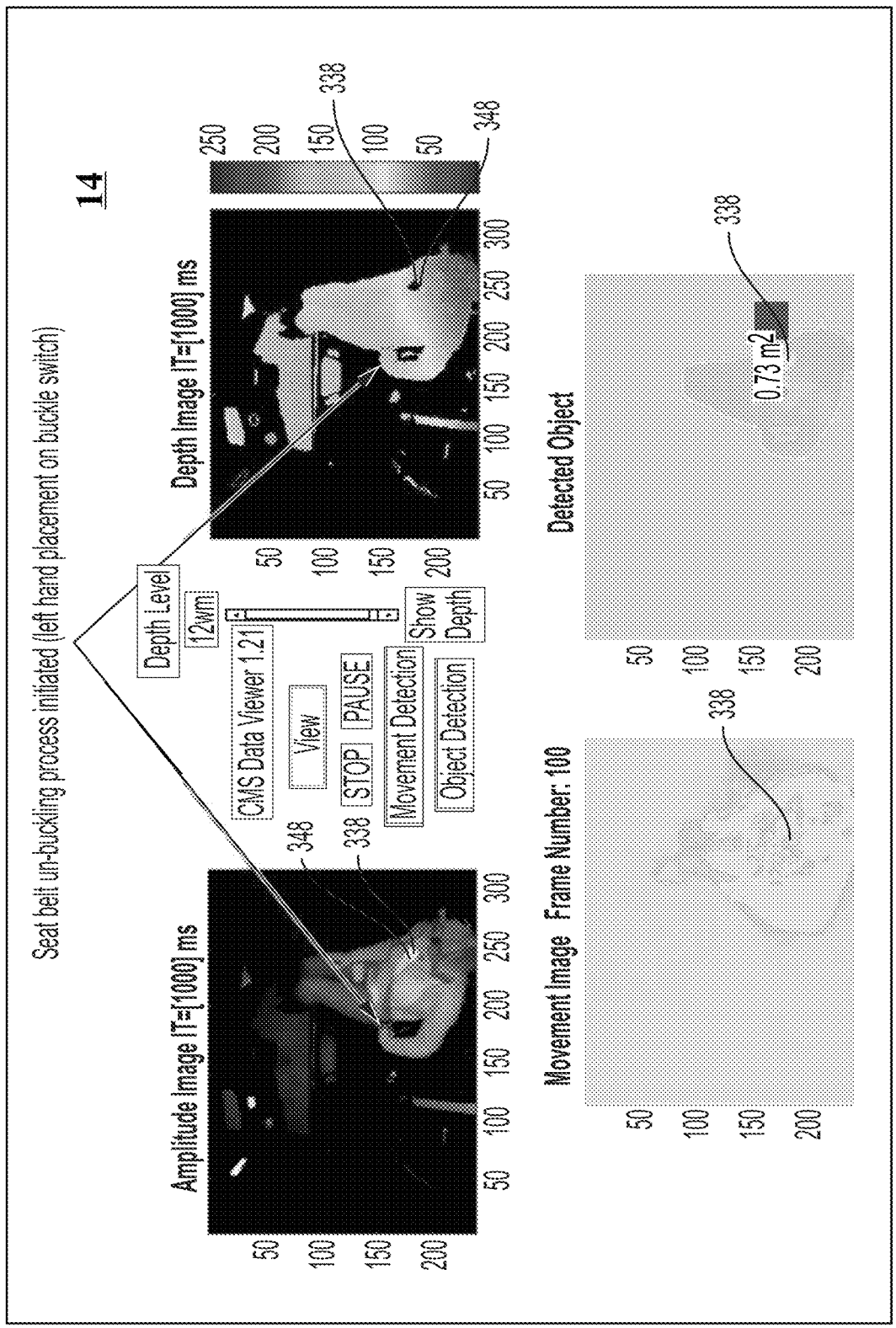
FIG. 23 presents a series of images in respective domains at time T6 of a vehicle interior as set forth in FIG. 15.
Figure 24:
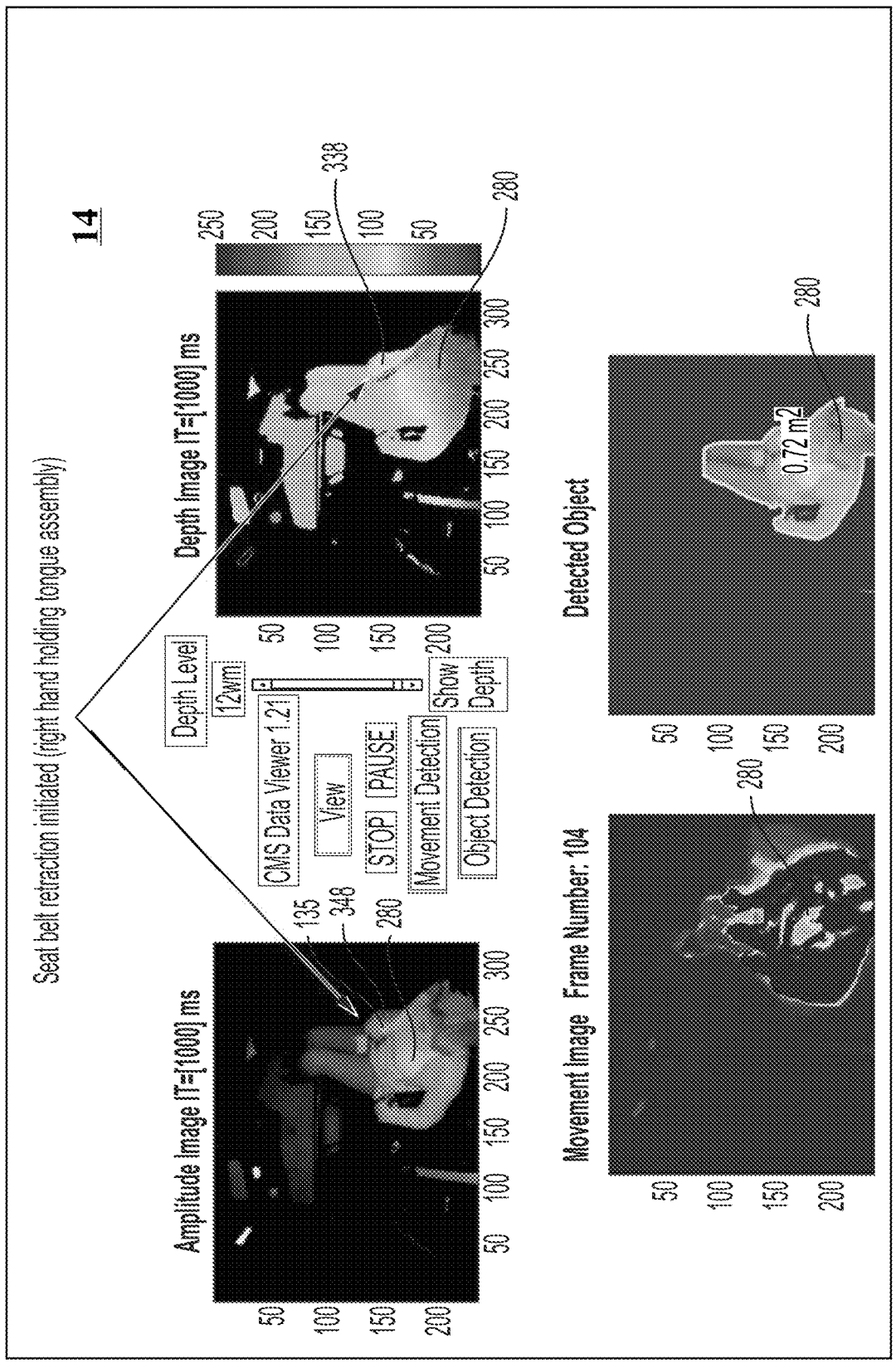
FIG. 24 presents a series of images in respective domains at time T7 of a vehicle interior as set forth in FIG. 15.
Figure 25:
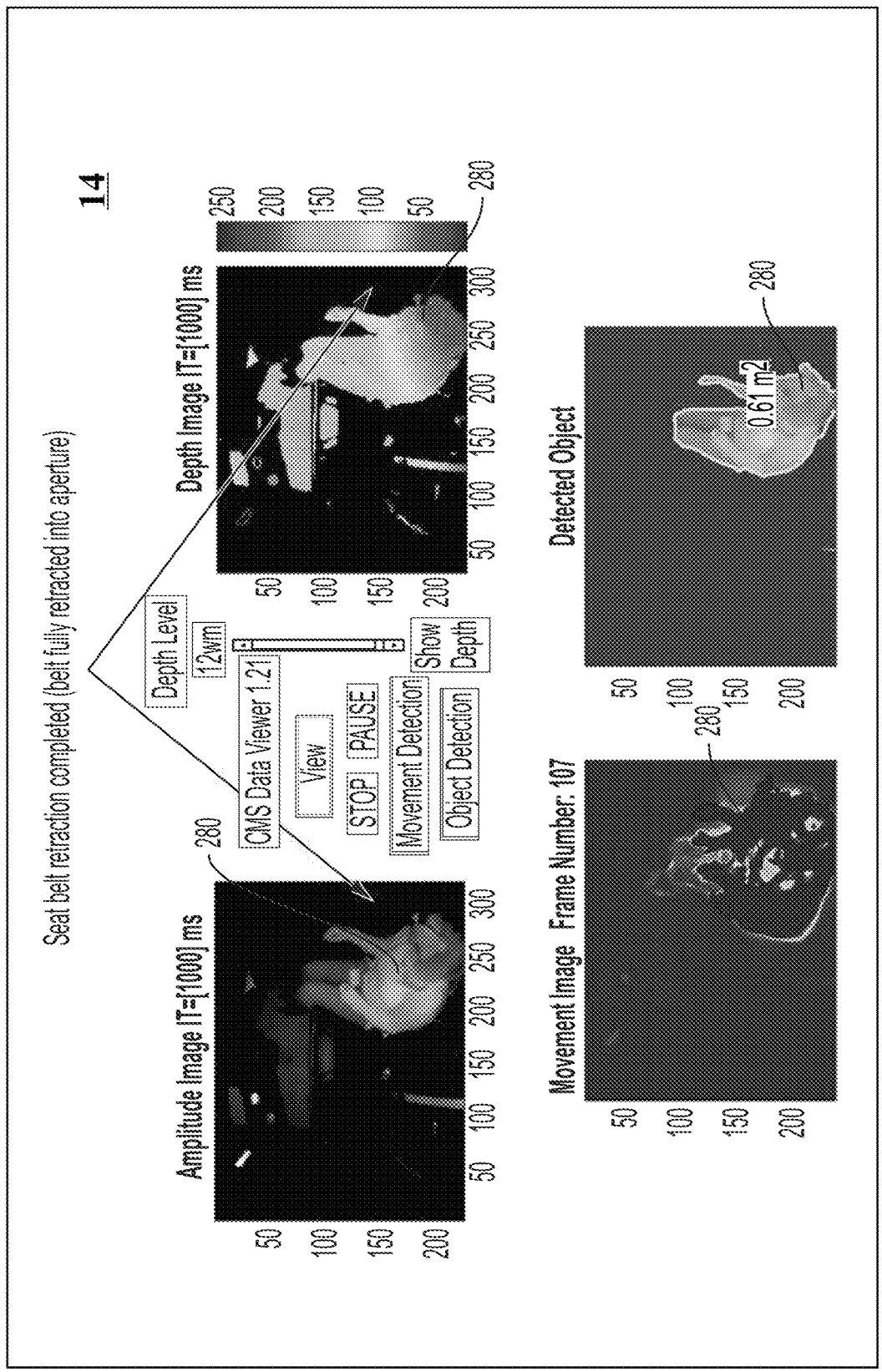
FIG. 25 presents a series of images in respective domains at time T8 of a vehicle interior as set forth in FIG. 15.
Figure 26:
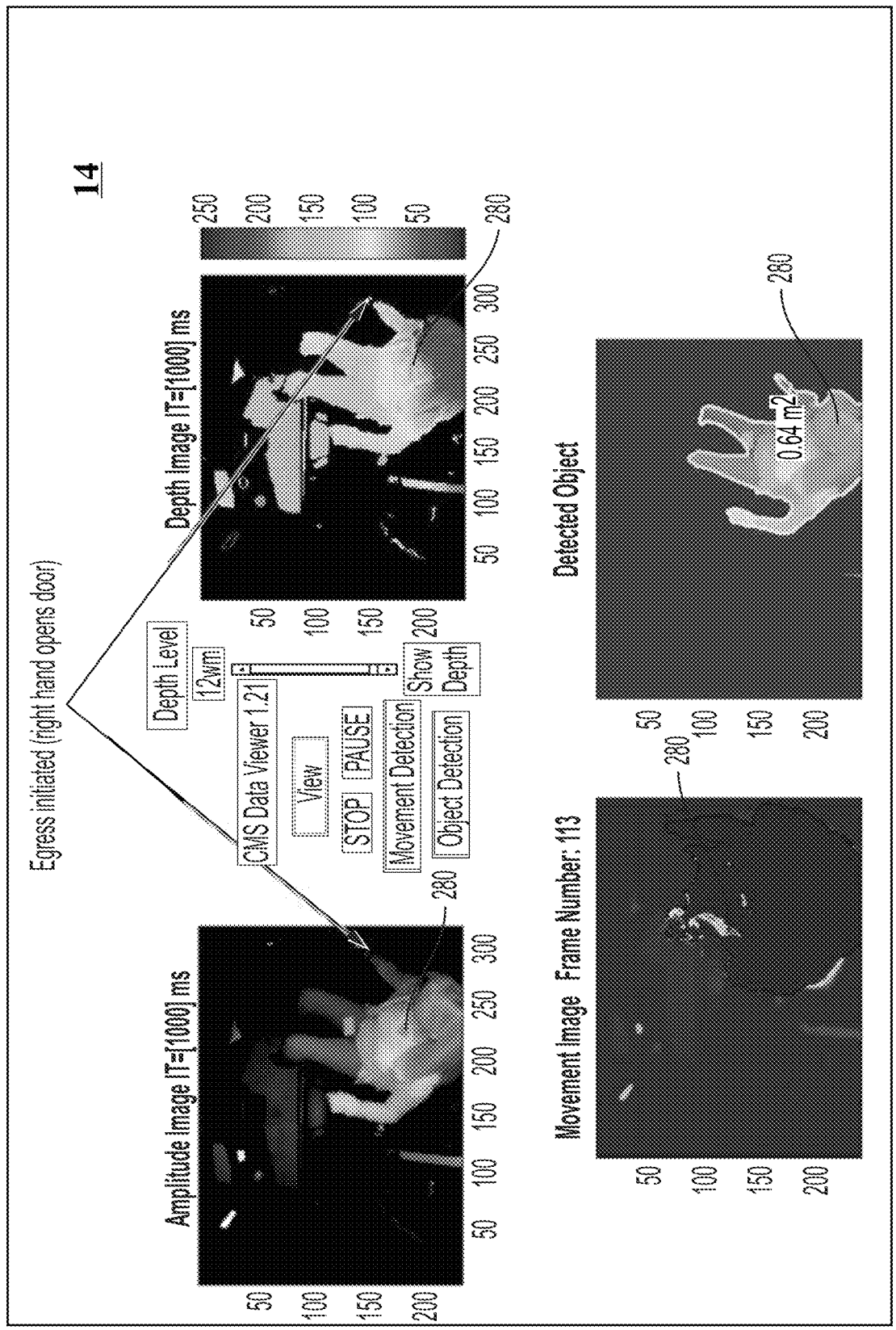
FIG. 26 presents a series of images in respective domains at time T9 of a vehicle interior as set forth in FIG. 15.
Figure 27:
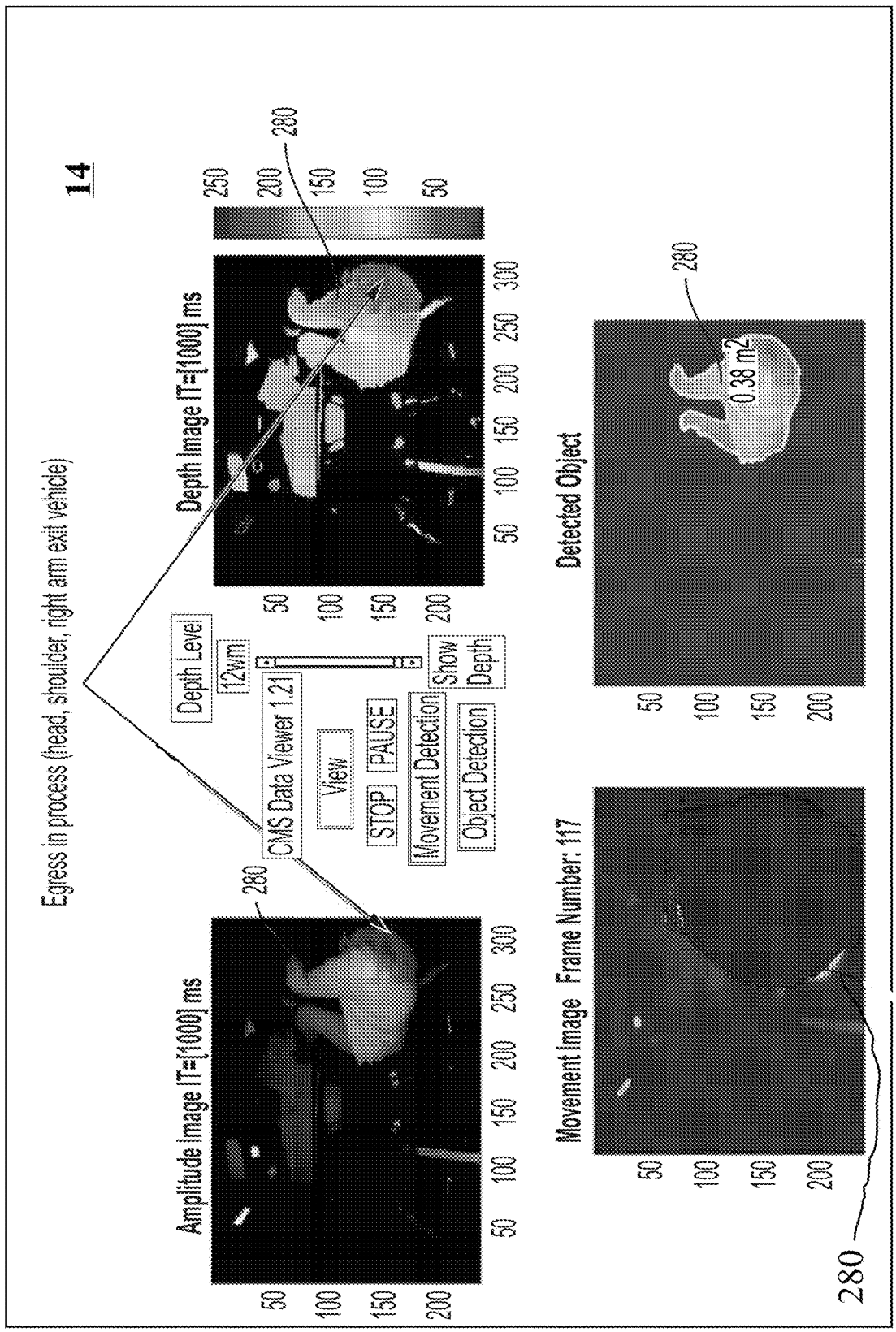
FIG. 27 presents a series of images in respective domains at time T10 of a vehicle interior as set forth in FIG. 15.
Figure 28:
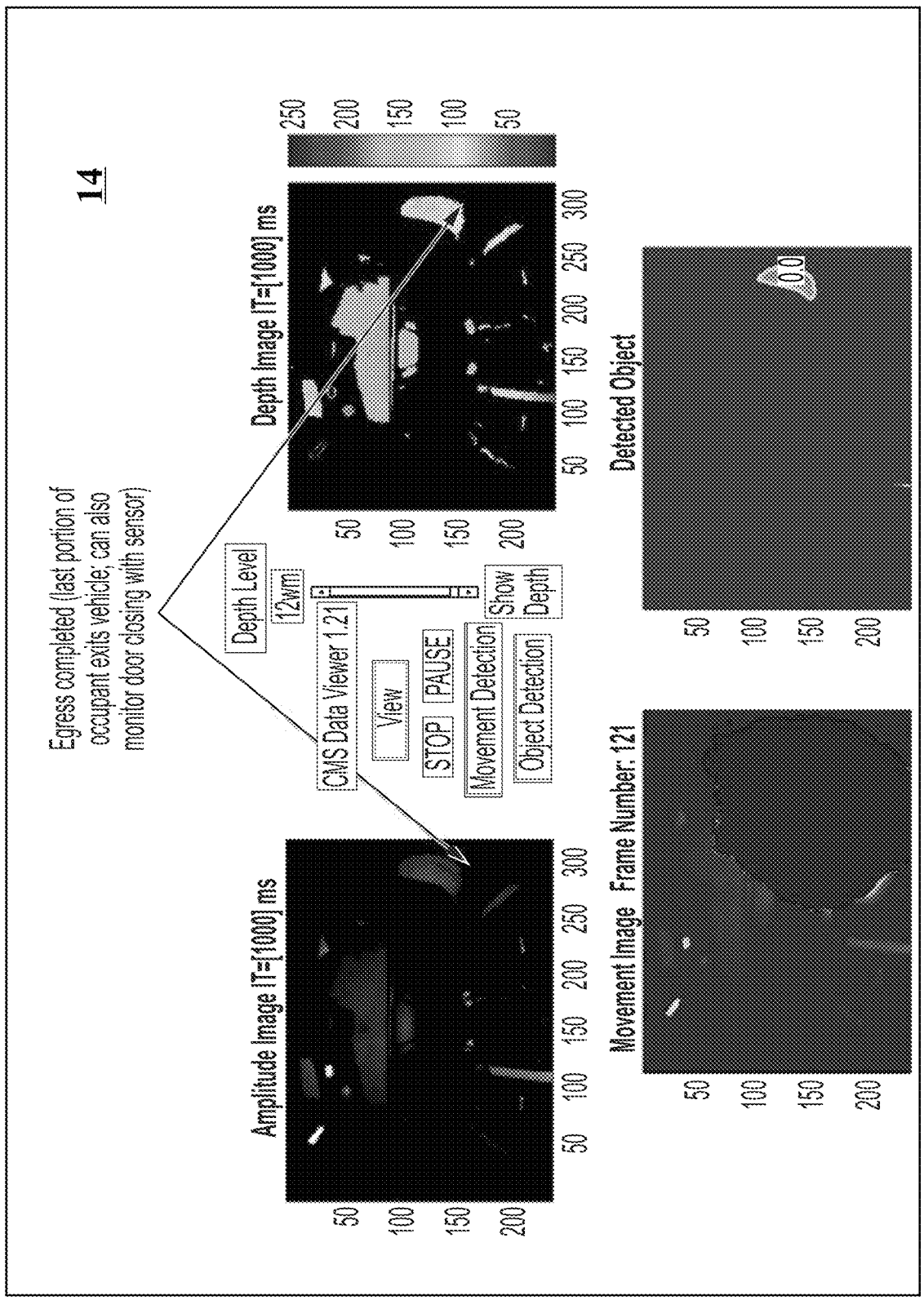
FIG. 28 presents a series of images in respective domains at time T11 of a vehicle interior as set forth in FIG. 15.

FIGS. 17-28 illustrate sample images taken across different domains, including reflected light amplitude images, depth images, movement images taken across the time domain, and object detection for a particular pattern, phase or wavelength of reflected light. In regard to the example of FIG. 17, the amplitude of reflected light received at an image sensor (14) shows components and reference structures such as the buckle hardware (235B, 235C) for the respective left and right seatbelt buckles and images of the respective web payout sections (244B, 244C) of the vehicle interior (10). In the depth image of FIG. 17, the floor (275) of the vehicle is ascertainable from the images as a reference as well. Given that this is time T0 in a series of images from the sensor, the left side web payout aperture (230B) has been identified in the detection image, due to a previously set wavelength of reflection or retroreflection properties. FIGS. 18-28 use the same concepts to identify a human occupant (280) progressing through a time series of images. FIG. 18 starts with images based on the ingress of the occupant's arm, shoulder, torso, and leg entering the vehicle interior (10) after opening a car door. FIG. 19 illustrates that the image sensor (14) may identify the occupant's entire body in the vehicle. As shown in FIG. 20 and discussed above, one of the reference structures identified and tracked herein may be the seat belt used by the occupant (280), particularly when the seat belt has reflective and retroreflective properties that have been tuned to provide quality images from an associated image sensor (14). Continuing to FIG. 21, the reflective and retroreflective layers and surfaces of a vehicle interior, in addition to reflective properties for commonly worn occupant attire, illustrate how the system of this disclosure can track the occupant (280) pulling the seat belt over the occupant's shoulder and chest. As noted above, patterns of reflective, retroreflective, and modified retroreflective layers and surfaces may be tuned so that portions of reference structures are visible in a given image. In FIGS. 22-23, the seat belt is tracked by a portion of the seat belt incorporating both a retroreflective surface (135) on the seat belt for a particular wavelength of reflection picked up by a corresponding image sensor. The seat belt also has an anti-reflection surface (348) that can be further used to tune qualities of reflected light arriving at an image sensor. For example, an anti-reflective coating can eliminate reflection of undesirable wavelengths that could cause noisy or saturated regions in an image. Instead, reflected light within the dynamic range of the image sensor shows up with a particular intensity amplitude (338) within the series of images. The corresponding depth images in FIGS. 22-23 utilize a full spectrum analysis of all wavelengths reflected by the components and occupants in the vehicle, such that the anti-reflection surface (348) is even more discernible as a non-reflected area (i.e., a dark spot) in a full spectrum image analysis within the field of view for depth calculations. As the series of images continue in the time domain, the images can be analyzed on a frame by frame basis to detect, identify, and track numerous occupants (280) as well as reference structures, whether the reference structures are fixed/static or adjustable/dynamic. For example, FIG. 24 shows how seat belt retraction can be monitored with retroreflective surfaces (135) in addition to anti-reflective surfaces (348) on the seat belt. FIG. 25 discloses representative images in which seat belt retraction is completed and completely tracked by the images sensors described herein. Such tracking may continue, as set forth in FIG. 26 through occupant egress with a vehicle door opened and as the egress is completed in FIGS. 27 and 28.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, network device may be applicable in other exchanges or routing protocols. Moreover, although network device has been illustrated with reference to particular elements and operations that facilitate the communication process, these elements, and operations may be replaced by any suitable architecture or process that achieves the intended functionality of network device.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. The structures shown in the accompanying figures are susceptible to 3-D modeling and can be described relative to vertical, longitudinal and lateral axes established with reference to neighboring components as necessary.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an "application" as used herein this Specification, can be inclusive of an executable file comprising instructions that can be understood and processed on a computer, and may further include library modules loaded during execution, object files, system files, hardware logic, software logic, or any other executable modules.

In example implementations, at least some portions of the activities may be implemented in software provisioned on a networking device. In some embodiments, one or more of these features may be implemented in computer hardware, provided external to these elements, or consolidated in any appropriate manner to achieve the intended functionality. The various network elements may include software (or reciprocating software) that can coordinate image development across domains such as time, amplitude, depths, and various classification measures that detect movement across frames of image data and further detect particular objects in the field of view in order to achieve the operations as outlined herein. In still other embodiments, these elements may include any suitable algorithms, hardware, software, components, modules, interfaces, or objects that facilitate the operations thereof.

Furthermore, computer systems described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that single processor and a single memory element are responsible for certain activities. In a general sense, the arrangements depicted in the Figures may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory can store data used for the operations described herein. This includes the memory being able to store instructions (e.g., software, logic, code, etc.) in non-transitory media, such that the instructions are executed to carry out the activities described in this Specification. A processor can execute any type of computer readable instructions associated with the data to achieve the operations detailed herein in this Specification. In one example, processors (e.g., processor) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.'

The invention claimed is:

1. A vehicle cabin monitoring system comprising:
   an image sensor connected to a computer processor and computer memory comprising software that controls the image sensor, wherein the image sensor is positioned to capture images of at least a portion of a vehicle interior;
   at least one reference structure positioned in the vehicle cabin within a field of view of the image sensor;
   an optically active component positioned on the reference structure, such that the reference structure comprises a lighted surface that is included within at least one of the images; and
   wherein a sequence of the images comprises differences in regard to the lighted surface of the reference structure, said differences indicating at least one status change of at least one item in the vehicle interior;
   wherein the optically active component is an illuminated surface that reflects light directed to the reference structure; and
   wherein the reference structure further comprises an optically attenuating layer that adjusts reflectivity of the reference structure to an extent such that reflected light arrives at the image sensor from the reference structure at an intensity for which the processor converts the reflected light to a measurement signal that is within a dynamic range of the image sensor.

2. A vehicle cabin monitoring system according to claim 1, further comprising a pattern on the illuminated surface, said pattern defining a plurality of optical characteristics of the illuminated surface.

3. A vehicle cabin monitoring system according to claim 1, wherein the illuminated surface comprises a retroreflective surface.

4. A vehicle cabin monitoring system according to claim 1, wherein the intensity is adjusted by the optically attenuating layer in conjunction with an angle of arrival of incident light.

5. A vehicle cabin monitoring system according to claim 1, wherein the reference structure within the vehicle is a static component having a fixed position that does not change in the vehicle interior or a dynamic component having an adjustable position in the vehicle interior.

6. A vehicle cabin monitoring system comprising:
   a light source providing projected light along a light projection path within a vehicle interior;
   an image sensor connected to a processor and computer memory, wherein the image sensor is positioned to receive either the projected light from the light source or reflected light back from the vehicle interior;
   at least one reference structure positioned in the vehicle interior within the light projection path and within a field of view of the image sensor;
   an optically active component positioned on the reference structure to direct the reflected light back to the image sensor;
   wherein the optically active component comprises a retroreflective surface and an optically attenuating layer on the retroreflective surface; and
   wherein the optically attenuating layer adjusts reflectivity of the optically active component to an extent such that the reflected light arrives at the image sensor from the reference structure at an intensity for which the processor converts the reflected light to a measurement signal that is within a dynamic range of the image sensor.

7. A vehicle cabin monitoring system according to claim 6, further comprising at least one filter in a position within the vehicle cabin permitting reflected light within a filter wavelength range to pass to the image sensor.

8. A vehicle cabin monitoring system according to claim 7, wherein the image sensor, the processor, and the computer memory utilize a plurality of measurement signals within the dynamic range to generate a point cloud image that comprises reflected intensity data and range data.

9. A vehicle cabin monitoring system according to claim 8 that generates a plurality of point cloud images over time to identify movement of items within the field of view, wherein the light source has a frequency greater than a detected frequency of changes in the point cloud image resulting from movement of the items.

10. A vehicle cabin monitoring system according to claim 6, wherein the optically attenuating layer comprises at least one surface characteristic that adjusts reflectivity of the retroreflective surface.

11. A vehicle cabin monitoring system according to claim 10, wherein the surface characteristic defines at least one blocking structure that lowers the intensity of the reflected light from the retroreflective surface.

12. A vehicle cabin monitoring system according to claim 6, wherein the retroreflective surface comprises a first fabric and the optically attenuating layer comprises a second fabric comprising a pattern of blocking structures lowering the reflectivity of the first fabric.

13. A vehicle cabin monitoring system according to claim 12, wherein the second fabric is a mesh with a coarseness of blocking structures that determines reflectivity of the first fabric.

14. A vehicle cabin monitoring system comprising:
   a light source providing projected light along a light projection path within a vehicle interior;
   a 3-D time of flight optical sensor connected to a processor and computer memory, wherein the optical sensor is positioned to receive reflected light back from the vehicle interior;
   a plurality of items positioned in the vehicle interior within the light projection path and within a field of view of the optical sensor, wherein at least one of the items is a reference structure comprising a retroreflective surface and an optically attenuating layer on the retroreflective surface;
   wherein the optically attenuating layer comprises a blocking structure that adjusts reflectivity of the reference structure such that reflected light transmitted from the reference structure to the optical sensor has an adjusted intensity that accounts for a position of the reference structure relative to the optical sensor; and wherein the 3-D time of flight optical sensor and the processor generate a point cloud image comprising a three-dimensional representation of the items relative to the reference structure within the optical sensor field of view.

15. A vehicle cabin monitoring system according to claim 14, wherein the projected light is infrared light, and the blocking structure in the optically attenuating layer absorbs infrared light.

16. A vehicle cabin monitoring system according to claim 14, wherein an angle of the projected light and a density of the blocking structure determine a degree at which the blocking structure lowers the adjusted intensity of the reflected light received at the sensor.

17. A vehicle cabin monitoring system according to claim 14, wherein the optically attenuating layer comprises a patterned surface having a plurality of blocking formations and defined openings exposing the retroreflective surface.

* * * * *